(12) United States Patent
Yamada et al.

(10) Patent No.: US 8,690,656 B2
(45) Date of Patent: Apr. 8, 2014

(54) GAME APPARATUS AND COMPUTER READABLE STORAGE MEDIUM STORING GAME PROGRAM

(75) Inventors: Yoichi Yamada, Kyoto (JP); Hidemaro Fujibayashi, Kyoto (JP); Eiji Aonuma, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 733 days.

(21) Appl. No.: 12/272,239

(22) Filed: Nov. 17, 2008

(65) Prior Publication Data
US 2010/0069159 A1   Mar. 18, 2010

(30) Foreign Application Priority Data

Sep. 12, 2008 (JP) ................................ 2008-235649

(51) Int. Cl.
*A63F 13/00* (2006.01)
(52) U.S. Cl.
USPC .................................. 463/7; 463/37; 463/43
(58) Field of Classification Search
None
See application file for complete search history.

(56) References Cited

U.S. PATENT DOCUMENTS

| | | | |
|---|---|---|---|
| 5,868,620 A * | 2/1999 | Wada et al. ...................... | 463/38 |
| 6,280,323 B1 | 8/2001 | Yamazaki et al. | |
| 7,223,173 B2 * | 5/2007 | Masuyama et al. ............. | 463/36 |
| 2001/0009867 A1 | 7/2001 | Sakaguchi et al. | |
| 2002/0016205 A1 | 2/2002 | Nagata et al. | |
| 2003/0109301 A1 * | 6/2003 | Chudley et al. ................. | 463/23 |
| 2004/0005926 A1 * | 1/2004 | LeFroy ............................ | 463/42 |
| 2004/0204237 A1 * | 10/2004 | Miyagawa et al. ............. | 463/30 |
| 2004/0209680 A1 * | 10/2004 | Oyamada et al. ............... | 463/31 |
| 2004/0224760 A1 * | 11/2004 | Miyamoto et al. .............. | 463/32 |
| 2005/0176502 A1 * | 8/2005 | Nishimura et al. ............. | 463/31 |
| 2006/0100020 A1 * | 5/2006 | Kasai ............................... | 463/42 |
| 2006/0258450 A1 * | 11/2006 | Ishihata et al. .................. | 463/31 |
| 2007/0050597 A1 | 3/2007 | Ikeda | |
| 2007/0072680 A1 * | 3/2007 | Ikeda .............................. | 463/43 |
| 2007/0202949 A1 * | 8/2007 | Kawade et al. .................. | 463/32 |
| 2007/0298881 A1 * | 12/2007 | Kawamura et al. ............. | 463/33 |

(Continued)

FOREIGN PATENT DOCUMENTS

| | | |
|---|---|---|
| JP | 5-74589 | 10/1993 |
| JP | 8-280933 | 10/1996 |

(Continued)

OTHER PUBLICATIONS

"Dondonpachi Daioujou", Monthly Arcadia Magazine, Enterbrain, Inc., May 1, 2003, vol. 4, No. 5, (the 36$^{th}$ volume), 6 pages with a partial English translation.

(Continued)

*Primary Examiner* — Melba Bumgarner
*Assistant Examiner* — George Howarah
(74) *Attorney, Agent, or Firm* — Nixon & Vanderhye, P.C.

(57) ABSTRACT

Instead of using an operation inputted by a player, a series of operation data for continuously moving a player character for a predetermined time period of a game is previously stored as automatic operation data. Automatic control means moves the player character based on the automatic operation data. Furthermore, the automatic control means receives a play start operation indicating that the player starts to play the game while the automatic control means moves the player character. A movement of the player character control led based on the automatic operation data is finished at a time when the play start operation is received, and the movement of the player character starts to be controlled based on an operation of the player.

8 Claims, 17 Drawing Sheets

(56) References Cited

U.S. PATENT DOCUMENTS

| | | | |
|---|---|---|---|
| 2008/0176653 A1* | 7/2008 | Kishi | 463/31 |
| 2008/0248869 A1* | 10/2008 | Umezaki | 463/31 |
| 2008/0311989 A1 | 12/2008 | Ikeda | |
| 2009/0062006 A1 | 3/2009 | Ikeda | |
| 2010/0203945 A1* | 8/2010 | Pitocchelli et al. | 463/19 |
| 2011/0003632 A1* | 1/2011 | Ansari et al. | 463/25 |

FOREIGN PATENT DOCUMENTS

| | | |
|---|---|---|
| JP | 10-201958 | 8/1998 |
| JP | 11-179050 | 7/1999 |
| JP | 2001-075553 | 3/2001 |
| JP | 2001-198350 | 7/2001 |
| JP | 2001-290902 | 10/2001 |
| JP | 2002-52256 | 2/2002 |
| JP | 2002-153667 | 5/2002 |
| JP | 2002-153676 | 5/2002 |
| JP | 2002-177649 | 6/2002 |
| JP | 2002-191868 | 7/2002 |
| JP | 2002-200351 | 7/2002 |
| JP | 2007-83013 | 4/2007 |
| JP | 2007-130507 | 5/2007 |

OTHER PUBLICATIONS

"Dondonpachi Daioujou", Monthly Arcadia Magazine, Enterbrain, Inc., Jun. 1, 2003, vol. 4, No. 6, (the 37$^{th}$ volume), 6 pages with a partial English translation.

\* cited by examiner

FIG. 3
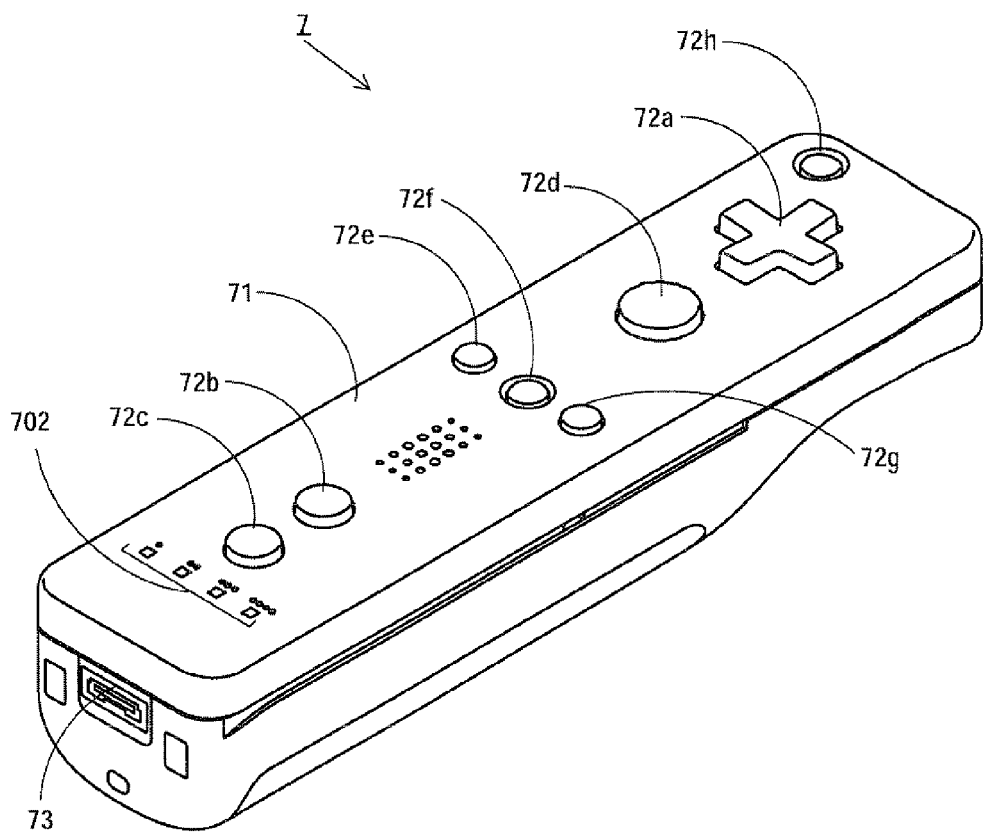
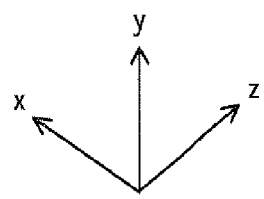

F I G. 7
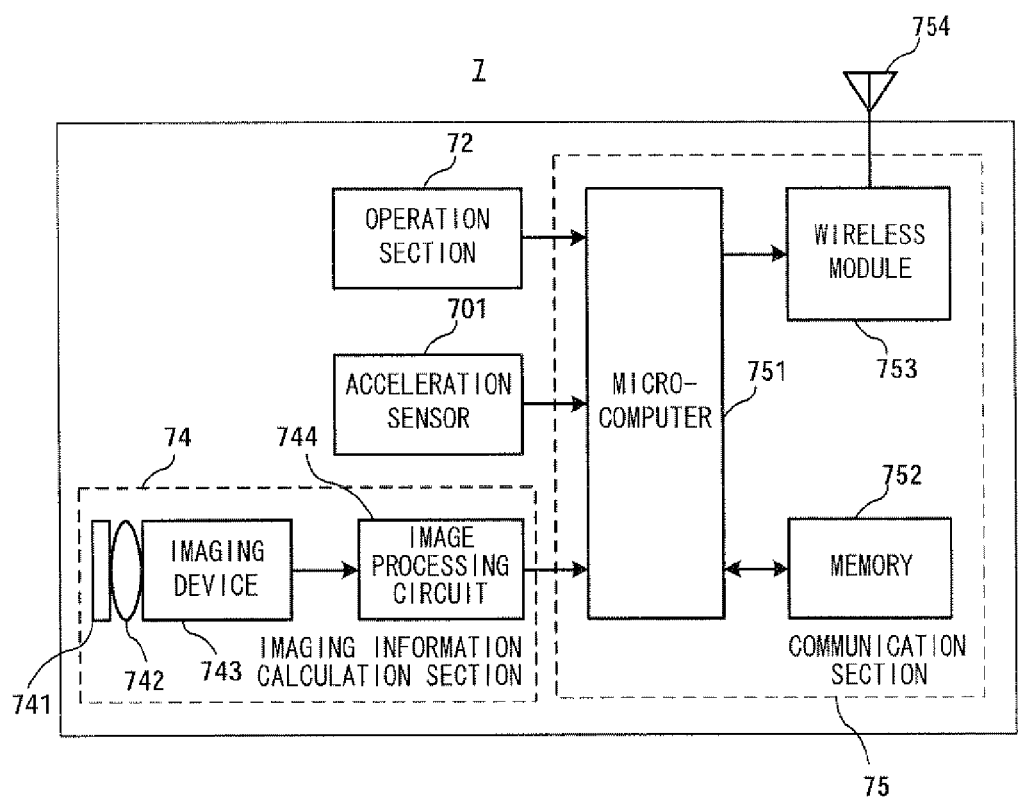

F I G. 1 8
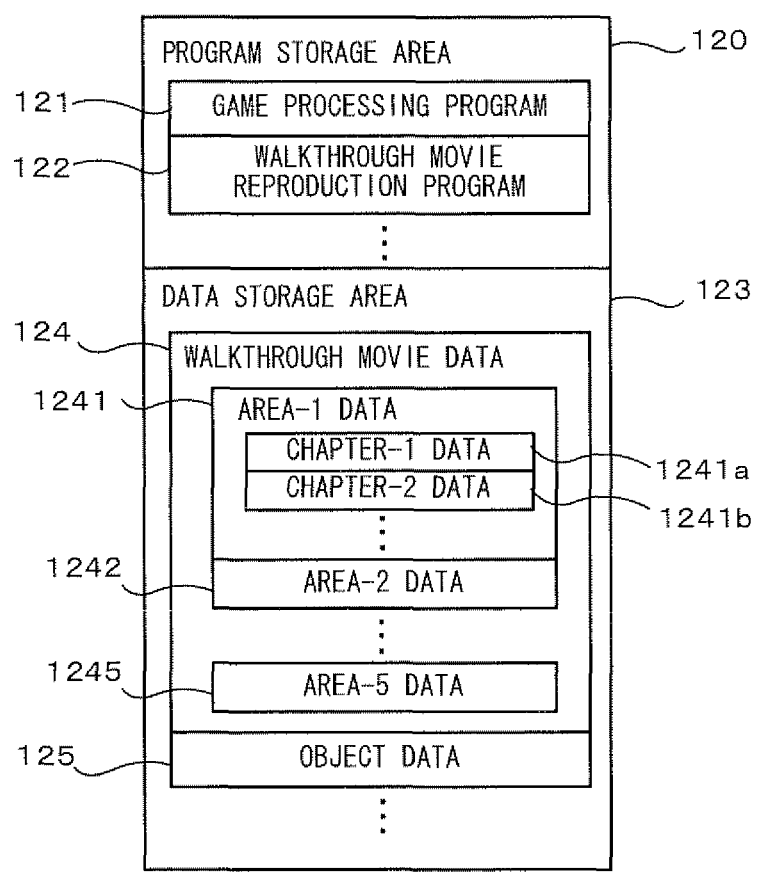

| | UP | DOWN | LEFT | RIGHT | A | B | 1 | 2 | + | − | HOME | PWR |
|---|---|---|---|---|---|---|---|---|---|---|---|---|
| 1311 | | | | | | | | | | | | |
| 1312 | 0 | 0 | 0 | 1 | 0 | 1 | 0 | 0 | 0 | 0 | 0 | 0 |

GAME APPARATUS AND COMPUTER READABLE STORAGE MEDIUM STORING GAME PROGRAM

CROSS REFERENCE TO RELATED APPLICATION

The disclosure of Japanese Patent Application No. 2008-235649, filed Sep. 12, 2008, is incorporated herein by reference.

BACKGROUND OF THE INVENTION

1. Field of the Invention

The present invention relates to a game apparatus and a computer readable storage medium storing a game program, and more particularly to a game apparatus that executes a game processing in which a player character is moved based on operation data outputted from an operation that is inputted to an input device controlled by a player and a computer readable storage medium storing a game program.

2. Description of the Background Art

Conventionally, various types of video games executed by a video game apparatus are available. The various types include a roll playing game, an action adventure game and an action roll playing game.

Mainly, in these types of games, a core story or scenario is previously set, and the game generally proceeds along such a story and scenario which is previously set. For some games, however, a content volume of the story or scenario is so large that a considerable time is required to clear the game. Furthermore, in order to increase interest in the game, there may be a case where various riddles are provided or extremely difficult actions (highly-skilled operations of a player) are required in the scenario. However, in some cases, because these riddles are too difficult to solve, a game progression is stalled mid-game and the game cannot be cleared all the way through to the end. As a method of solving such a problem, disclosed is a game control method in which the difficulty of a game is reduced by displaying a hint to advance the game while the game is played (Japanese Laid-Open Patent Publication No. 2002-20351, for example). In this game control method, a hint message is displayed when a party (a group including a player character controlled by a player) does not include a character that can perform a special action in the vicinity of a location where the special action is to be performed.

However, in the game control method disclosed in Japanese Laid-Open Patent Publication No. 2002-20351, there are the following problems. Specifically, in the game control method disclosed in Japanese Laid-Open Patent Publication No. 2002-20351, a hint is always displayed when a condition is satisfied. Therefore, for a player who wishes to solve riddles to conquer a game, hints to solve the riddles are always displayed before the player attempts to deeply ponder how to solve the riddles, thereby resulting in decreased interest in the game. Furthermore, it is not interesting enough to merely display the hint as a message.

Also, in the aforementioned game in which a content volume is so large that a considerable time is required to clear the game, a player can enjoy such a game having a large content volume if he or she has enough time to play the game all the way through to the end. However, for a player who cannot spare that much time to play the game, it is impossible to enjoy the game all the way through to the end and thus he or she is likely to give up the game partway through.

SUMMARY OF THE INVENTION

Therefore, an object of the present invention is to provide a game apparatus and a computer readable storage medium storing a game program in which walkthrough information of a game is provided only when a player needs the information, and even if a player cannot spare enough time to play the game, he or she can proceed with and finally clear the game.

The present invention has the following features to attain the object mentioned above. Note that reference numerals and supplemental remarks are shown in parentheses below for assisting the reader in finding corresponding components in the figures to facilitate the understanding of the present invention, but they are in no way intended to restrict the scope of the invention.

A first aspect is directed to a game apparatus that executes a game processing in which a player character is moved based on operation data outputted from an operation that is inputted to an input device controlled by a player, and is displayed on a display device, and the game apparatus comprises operation data storage means (12), automatic control means (10), start reception means (10), and game processing means (10). The operation data storage means stores a series of operation data, as automatic operation data, for continuously moving the player character for a predetermined time period of a game, instead of using the operation inputted by the player. The automatic control means reads the automatic operation data from the operation data storage means so as to sequentially move the player character based on the read automatic operation data for the predetermined time period, and displays the player character on the display device. The start reception means receives a play start operation indicating that the player starts to play the game for a time period during which the player character is moved by the automatic control means. The game processing means stops the automatic control means from moving the player character based on the automatic operation data at a time when the play start operation is received, and controls, after the play start operation is received, a movement of the player character so as to be continued from a state of the player character at the time when the play start operation is received, based on the operation data outputted from the operation that is inputted to the input device controlled by the player. Note that in the case where a game proceeds along a predetermined game scenario such as a roll playing game or an adventure game, "a predetermined time period of a game" recited in the above claim corresponds to "a chapter", for example, which is one of a plurality of portions into which one scenario is divided. Alternatively, in the case where a game is stage-clear type, "a predetermined time period of a game" corresponds to "a stage" as one of a plurality of stages provided in the game.

According to the first aspect, a scene including an operation difficult for the player is presented (for the predetermined time period of the game) such that the player character is moved based on the automatic operation data, thereby making it possible to show the player a method of conquering the scene. As a result, even if the player is unfamiliar with the game, he or she can enjoy playing the game all the way through to the end without getting stuck in a game progression. Furthermore, while the player character is moved based on the automatic operation data, a movement control of the player character can be switched over to a movement control performed based on an operation that is inputted by the player. Therefore, after the player obtains minimum walkthrough information, it becomes possible to cancel an automatic operation of the player character so as to switch over to the movement control performed by the player. As a result, it also becomes possible to leave the player with discretion to have the satisfaction of conquering the game on his or her own.

In the second aspect based on the first aspect, the game apparatus comprises speed change reception means (10) for receiving, for the time period during which the player character is moved by the automatic control means, an instruction to change a setting of a speed at which the movement of the player character is displayed. The automatic control means displays the movement of the player character based on a speed set by the speed change reception means.

In a third aspect based on the second aspect, the automatic operation data is composed of a plurality of pieces of operation data divided by a unit time equal to or shorter than a time period in which a display is updated. The automatic control means executes a movement processing of sequentially reading the plurality of pieces of operation data divided by the unit time so as to move the player character based on each of the plurality of pieces of operation data, and displays, each time the display is updated, the player character at a time when the display is updated, on the display device, and changes the speed at which the movement of the player character is displayed by changing, in accordance with the speed set by the speed change reception means, the number of times the movement processing is executed within the time period in which the display is updated.

In a fourth aspect based on the third aspect, the automatic control means performs a fast-forward reproduction by increasing the number of times the movement processing is executed within the time period in which the display is updated.

In a fifth aspect based on the third aspect, the automatic control means performs a slow reproduction by decreasing the number of times the movement processing is executed within the time period in which the display is updated.

According to the second to fifth aspects, it becomes possible to allow the player to change the speed at which the movement of the player character is displayed by the automatic control means. Thus, the player can deliberately observe, by means of the slow reproduction, a content of the movement of the player character performed by the automatic control means, and also can view the movement of the player character by fast-forwarding a content which has already been viewed once, thereby increasing the convenience for the player.

In a sixth aspect based on the first aspect, the input device includes a button which can be pressed. The automatic operation data includes button data for indicating whether or not an operation of pressing the button is performed.

According to the sixth aspect, the movement of the player character can be automatically controlled when a complex button operation is required to move the player character.

In a seventh aspect based on the first aspect, the input device includes an acceleration sensor. The automatic operation data includes acceleration data outputted from the acceleration sensor.

According to the seventh aspect, it becomes possible to control the movement of the player character based on the automatic operation data for an operation using the acceleration data. Therefore, the automatic operation is performed for an operation difficult for the player such as an operation of waving the input device itself, thereby making it possible to prevent the player from getting stuck in the game progression.

In an eighth aspect based on the first aspect, the input device includes a gyro sensor. The automatic operation data includes angular rate data outputted from the gyro sensor.

According to the eighth aspect, it becomes possible to control the movement of the player character based on the automatic operation data for an operation using the angular rate data. Therefore, the automatic operation is performed for an operation difficult for the player such as an operation of waving the input device itself, thereby making it possible to prevent the player from getting stuck in the game progression.

A ninth aspect based on the first aspect, the input device includes imaging means for imaging at least one imaging target. The automatic operation data includes information regarding a position of the at least one imaging target included in a picked up image represented by picked up image data outputted from the input device including the imaging means.

According to the ninth aspect, it becomes possible to calculate a direction in which the input device is facing and a tilt of the input device based on the information regarding the position of the imaging target. Thus, an operation using a direction or tilt of the input device can be automatically performed.

A tenth aspect is directed to a computer readable storage medium storing a game program causing a computer of a game apparatus to execute a game processing in which a player character is moved based on operation data outputted from an operation that is inputted to an input device controlled by a player, and is displayed on a display device, and the game program causes the computer to function as automatic control means (S6, S7, S10), start reception means (S11), and game processing means (S12). The automatic control means reads, from operation data storage means for storing a series of operation data, as automatic operation data, for continuously moving the player character for a predetermined time period of a game, instead of using the operation inputted by the player, the automatic operation data so as to sequentially move the player character based on the read automatic operation data for the predetermined time period, and displays the player character on the display device. The start reception means receives a play start operation indicating that the player starts to play the game for a time period during which the player character is moved by the automatic control means. The game processing means stops the automatic control means from moving the player character based on the automatic operation data at a time when the play start operation is received, and controls, after the play start operation is received, a movement of the player character so as to be continued from a state of the player character at the time when the play start operation is received, based on the operation data outputted from the operation that is inputted to the input device controlled by the player.

In an eleventh aspect based on the tenth aspect, the game program causes the computer to further function as speed change reception means (S2, S3) for receiving, for the time period during which the player character is moved by the automatic control means, an instruction to change a setting of a speed at which the movement of the player character is displayed. The automatic control means displays the movement of the player character based on a speed set by the speed change reception means.

In a twelfth aspect based on the eleventh aspect, the automatic operation data is composed of a plurality of pieces of operation data divided by a unit time equal to or shorter than a time period in which a display is updated. The automatic control means executes a movement processing of sequentially reading the plurality of pieces of operation data divided by the unit time so as to move the player character based on each of the plurality of pieces of operation data, and displays, each time the display is updated, the player character at a time when the display is updated, on the display device, and changes the speed at which the movement of the player character is displayed by changing, in accordance with the speed set by the speed change reception means, the number of times the movement processing is executed within the time period in which the display is updated.

In a thirteenth aspect of the twelfth aspect, the automatic control means performs a fast-forward reproduction by increasing the number of times the movement processing is executed within the time period in which the display is updated.

In a fourteenth aspect based on the twelfth aspect, the automatic control means performs a slow reproduction by decreasing the number of times the movement processing is executed within the time period in which the display is updated.

In a fifteenth aspect based on the tenth aspect, the input device includes a button which can be pressed. The automatic operation data includes button data for indicating whether or not an operation of pressing the button is performed.

In a sixteenth aspect based on the tenth aspect, the input device includes an acceleration sensor. The automatic operation data includes acceleration data outputted from the acceleration sensor.

In a seventeenth aspect based on the tenth aspect, the input device includes a gyro sensor, and the automatic operation data includes angular rate data outputted from the gyro sensor.

In an eighteenth aspect based on the tenth aspect, the input device includes imaging means for imaging at least one imaging target. The automatic operation data includes information regarding a position of the at least one imaging target included in a picked up image represented by picked up image data outputted from the input device including the imaging means.

A nineteenth aspect is directed to a game apparatus that executes a game processing in which a player character is moved based on operation data outputted by an operation that is inputted to an input device controlled by a player, and the game apparatus comprises operation data storage means (12), and control means (10). The operation data storage means stores a series of operation data, as previously created automatic operation data for continuously moving the player character, instead of using the operation inputted by the player. The control means switches a control of the player character between a first control mode where a movement of the player character is controlled based on the operation data outputted from the operation that is inputted to the input device controlled by the player and a second control mode where the automatic operation data is read from the operation data storage means so as to control the movement of the player character based on the automatic operation data, in accordance with a predetermined switch instruction operation inputted by the player.

According to the nineteenth aspect, while playing the game, the player can use the automatic operation data to move the player character for a scene including an operation difficult for the player. As a result, even if the player is unfamiliar with the game, he or she can enjoy playing the game all the way through to the end.

In a twentieth aspect based on the nineteenth aspect, the game apparatus further comprises start reception means for receiving a play start operation indicating that the player starts to play the game. The control means switches over the control of the player character, when the play start operation is received for a time period during which the player character is controlled in the second control mode, to the first control mode while maintaining a state of the player character at a time when the play start operation is received.

According to the twentieth aspect, while the player character is moved based on the automatic operation data, the player can switch over the movement control of the player character to an operation of the player at any desired timing.

According to the present invention, a scene including an operation difficult for the player is presented to the player such that an operation is automatically performed based on the automatic operation data, thereby making it possible to show the player a method of conquering the scene. Furthermore, while the player character is moved based on the automatic operation data, the movement control of the player character can be switched over to an operation inputted by the player. Thus, even if the player is unfamiliar with the game, he or she can enjoy playing the game all the way through to the end without getting stuck in the game.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a perspective view of a controller 7 of FIG. 1 as viewed from a top rear side thereof;

FIG. 7 is a block diagram illustrating a configuration of the controller 7 of FIG. 3;

FIG. 18 is a diagram illustrating a memory map of an external main memory 12 included in a game apparatus 3;

DESCRIPTION OF THE PREFERRED EMBODIMENTS

Overall Configuration of Game System

Figure 1:
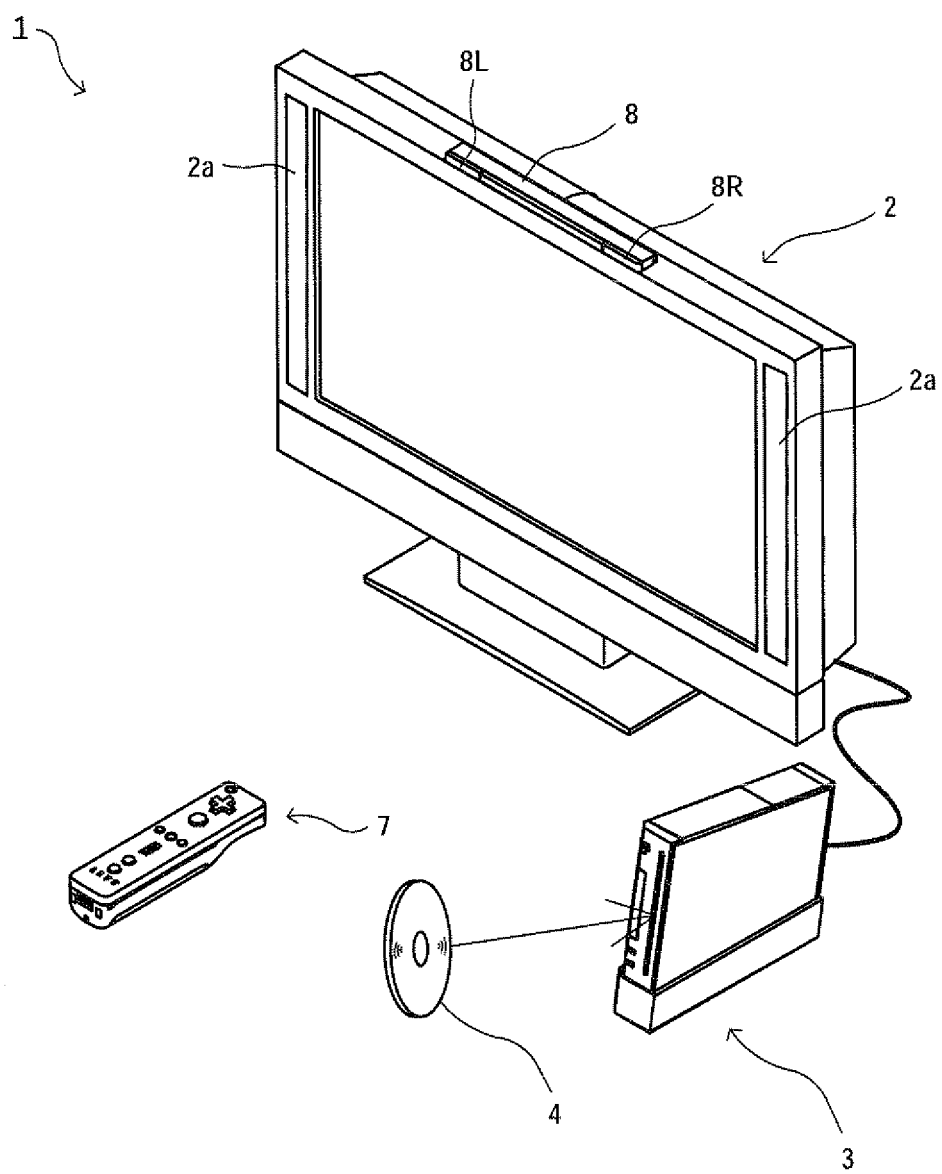
FIG. 1 is an external view illustrating a game system 1 according to an embodiment of the present invention.

With reference to FIG. 1, a game system 1 including a game apparatus according to the embodiment of the present invention will be described. FIG. 1 is an external view illustrating the game system 1. Hereinafter, the game apparatus and a game program of the present invention will be described by using a stationary game apparatus as an example. In FIG. 1, the game system 1 includes a television receiver (hereinafter simply referred to as "television") 2, a game apparatus 3, an optical disc 4, a controller 7, and a marker section 8. The present system causes the game apparatus 3 to execute game processing in accordance with a game operation using the controller 7.

To the game apparatus 3, the optical disc 4, which is an exemplary information storage medium exchangeably used for the game apparatus 3, is detachably inserted. On the optical disc 4, a game program to be executed by the game apparatus 3 is stored. An insertion slot for the optical disc 4 is provided at the front face of the game apparatus 3. The game apparatus 3 executes game processing by reading and executing the game program stored on the optical disc 4 inserted through the insertion slot.

To the game apparatus 3, the television 2, which is an exemplary display apparatus, is connected via a connection cord. The television 2 displays a game image obtained as a result of the game processing executed by the game apparatus 3. Further, on the periphery of a screen of the television 2 (an upper side of the screen in FIG. 1), the marker section 8 is provided. The marker section 8 has two markers 8R and 8L located at both ends thereof. The marker 8R (as well as the marker 8L) is specifically composed of one or more infrared LEDs, and outputs infrared light forward from the television 2. The marker section 8 is connected to the game apparatus 3, and the game apparatus 3 is capable of controlling lighting of respective red infrared LEDs contained in the marker section 8.

The controller 7 is an input device for providing the game apparatus 3 with operation data representing a content of an operation applied to the controller 7. The controller 7 and the game apparatus 3 are connected to each other by wireless communication. In the present embodiment, a technique of Bluetooth (registered trademark), for example, is used for the wireless communication between the controller 7 and the game apparatus 3. In another embodiment, the controller 7 and the game apparatus 3 may be connected to each other via a fixed line.

Internal Configuration of Game Apparatus 3

Figure 2:
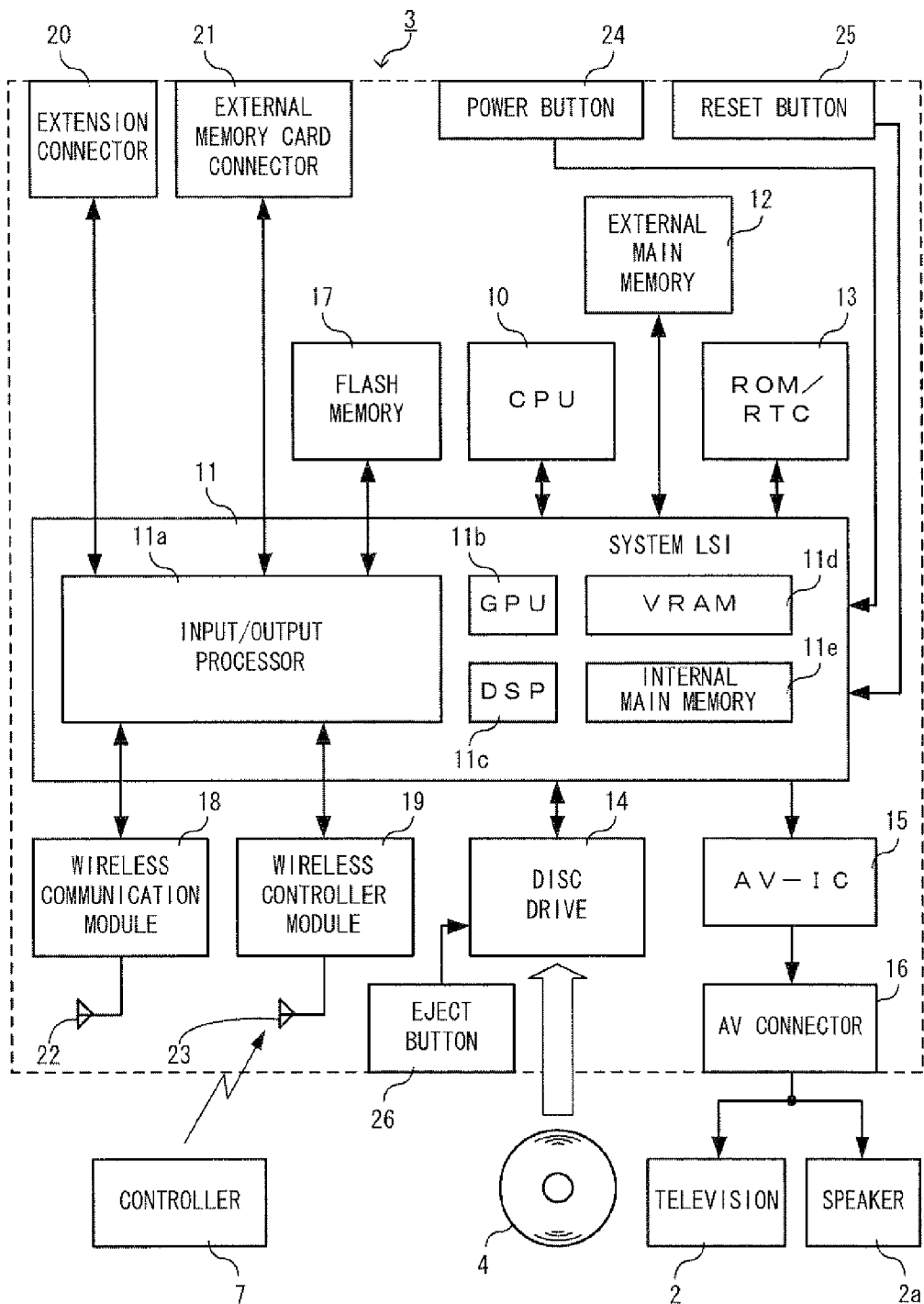
FIG. 2 is a functional block diagram illustrating a configuration of a game apparatus 5.

Next, with reference to FIG. 2, an internal configuration of the game apparatus 3 will be described. FIG. 2 is a functional block diagram illustrating a configuration of the game apparatus 3. The game apparatus 3 includes a CPU 10, a system LSI 11, an external main memory 12, a ROM/RTC 13, a disc drive 14, an AV-IC 15, and the like.

The CPU 10 executes the game processing by causing the game program stored on the optical disc 4 to be executed, and functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processing such as control of data transmission between respective component parts connected thereto, generation of an image to be displayed, and obtainment of data from an external apparatus. An internal configuration of the system LSI will be described later. The external main memory 12, which is of a volatile type, stores programs such as a game program read from the optical disc and the flash memory 17, and other various data, and is used as a work area and buffer space for the CPU 10. The ROM/RTC 13 includes a ROM (so-called a boot ROM) incorporating a program booting the game apparatus 3, and a clock circuit for counting time (RTC: Real Time Clock). The disc drive 14 reads, from the optical disc 4, the program data, texture data and the like, and writes the read data into an internal main memory 11e described later, or the external main memory 12.

Further, provided in the system LSI 11 are an input/output processor 11a, a GPU (Graphics Processor Unit) 11b, a DSP (Digital Signal Processor) 11c, a VRAM 11d, and the internal main memory 11e. These component parts 11a to 11e are, though not shown in diagrams, connected to one another via an internal bus.

The GPU 11b forms a portion of drawing means, and generates an image in accordance with a graphics command (draw command) from the CPU 10. More specifically, the GPU 11b generates game image data by performing, in accordance with the graphics command, calculation processing necessary to display 3D graphics, for example, coordinate conversion from 3D coordinates to 2D coordinates, which corresponds to processing before rendering, and final rendering processing such as texture pasting. Here, the CPU 10 provides the GPU 11b with not only the graphics command, but also an image generation program necessary to generate the game image data. The VRAM 11d stores data (such as polygon data and the texture data) necessary for the GPU 11b to execute the graphics command. When an image is generated, the GPU 11b generates the image data by using the data stored in the VRAM 11d.

The DSP 11c functions as an audio processor, and generates audio data by using sound data and sound waveform (tone quality) data stored in the internal main memory 11e and the external main memory 12. Similarly to the external main memory 12, the internal main memory 11e stores programs and various data, and is used as a work area and buffer space for the CPU 10.

The image data and the audio data generated as above described, is read by the AV-IC 15. The AV-IC 15 outputs the read image data to the television 2 via an AV connector 16, and also outputs the read audio data to a speaker 2a embedded in the television 2. Accordingly, the image is displayed on the television 2, and the sound is outputted from the speaker 2a.

The input/output processor (I/O processor) 11a executes data transmission with component parts connected thereto and data downloading from an external apparatus. The I/O processor 11a is connected to the flash memory 17, a wireless communication module 18, a wireless controller module 19, an extension connector 20, and an external memory card connector 21. To the wireless communication module 18, an antenna 22 is connected, and to the wireless controller module 19, an antenna 23 is connected.

The I/O processor 11a is connected to a network via the wireless communication module 18 and the antenna 22 and is capable of communicating with other game apparatuses or various servers connected to the network. The I/O processor 11a accesses the flash memory 17 at regular intervals so as to detect data, if any, necessary to transmit to the network. If the data is detected, the detected data is transmitted to the network via the wireless communication module 18 and the antenna 22. Further, the I/O processor 11a receives data transmitted from the other game apparatuses or downloaded from a download server via the network, the antenna 22 or the wireless communication module 18, and stores the received data in the flash memory 17. The CPU 10 executes the game program so as to read the data stored in the flash memory 17 and causes the game program to use the read data. In the flash memory 17, not only the data transmitted between the game apparatus 3 and the other game apparatuses or the various servers, but also save data of a game (result data or intermediate step data of the game) played by using the game apparatus 3 may be stored.

Further, the I/O processor 11a receives the operation data transmitted from the controller 22 via the antenna 23 and the wired controller module 19, and (temporarily) stores the operation data in the internal main memory 11e or in a buffer space of the external main memory 12.

Further, to the I/O processor 11a, the extension connector 20 and the external memory card connector 21 are connected. The extension connector 20 is a connector for an interface such as a USB and a SCSI, and is capable of performing communication with the network, instead of the wireless communication module 18, by connecting thereto a medium such as an external storage, a peripheral device such as another controller, or a wired communication connector. The external memory card connector 21 is a connector for connecting the external storage medium such as the memory card. For example, the I/O processor 11a accesses the external storage medium via the extension connector 20 or the external memory card connector 21, and then saves data or reads data.

Provided to the game apparatus 3 are a power button 24, a reset button 25, and an eject button 26. The power button 24 and the reset button 25 are connected to the system LSI 11. When the power button 24 is turned on, the power is supplied to the respective components of the game apparatus 3 via an AC adapter which is not shown. Further, when the power button 24 is pressed again during the state of the power being on, the state shifts to a low-power standby mode. The power is supplied to the game apparatus 3 even in such state, and thus the game apparatus 3 is at all times capable of being connected to the network such as the Internet. In the case of turning off the power after the power is turned on, it is possible to turn off the power by holding down the power button 24 for a predetermined time period or longer. When the reset button 25 is pressed, the system LSI 11 reactivates a start-up program of the game apparatus 3. The eject button 26 is connected to the disc drive 14. When the eject button 26 is pressed, the optical disc 4 is ejected from the disc drive 14.

Figure 4:
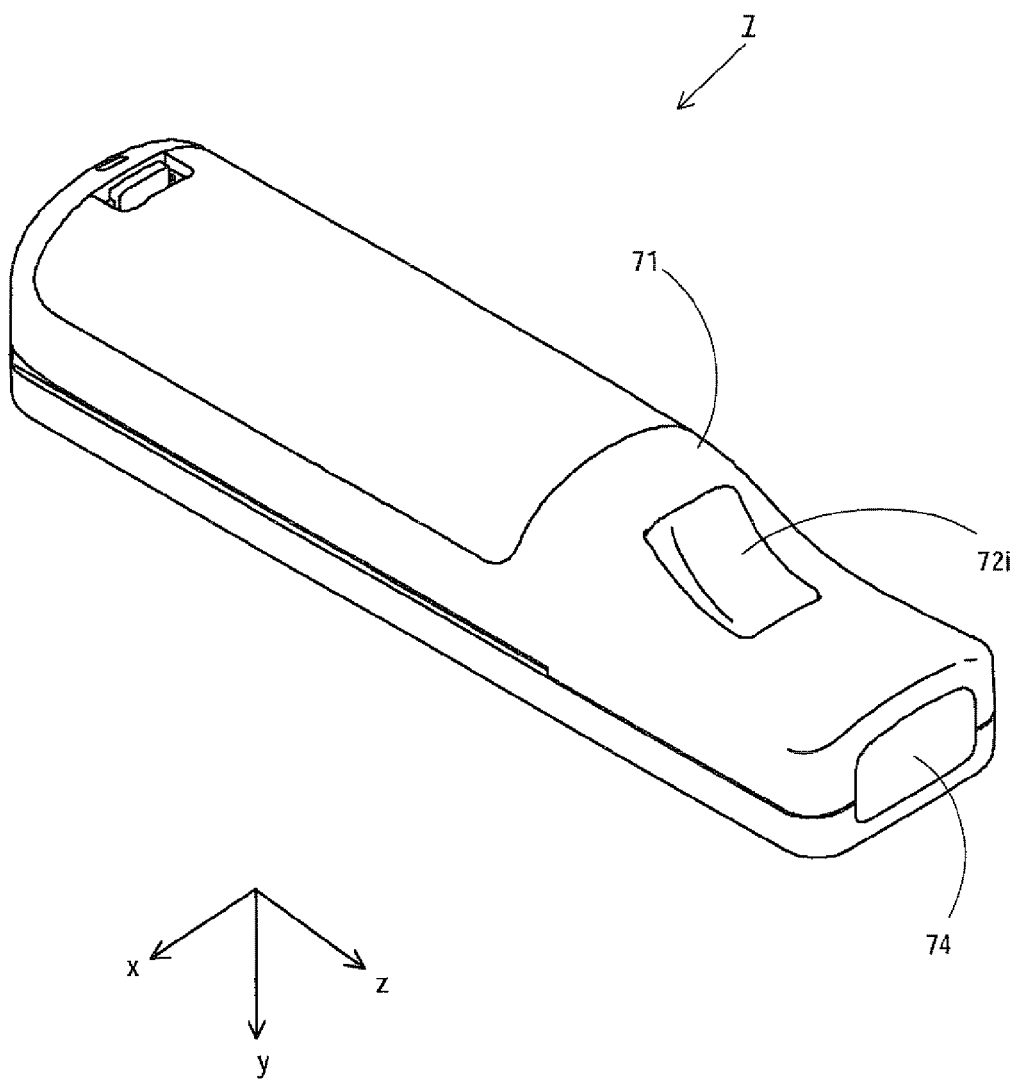
FIG. 4 is a perspective view of the controller 7 of FIG. 3 as viewed from a bottom front side thereof.

With reference to FIGS. 3 and 4, the controller 7 will be described. FIG. 3 is a perspective view of a controller 7 as viewed from a top rear side thereof. FIG. 4 is a perspective view of the controller 7 as viewed from a bottom front side thereof.

In FIGS. 3 and 4, the controller 7 includes a housing 71 and an operation section 72 composed of a plurality of operation buttons provided on the surface of the housing 71. The housing 71 of the present embodiment has a substantially parallelepiped shape extending in a longitudinal direction from front to rear, and an overall size thereof is small enough to be held by one hand of an adult or even a child. The housing 71 is formed by, for example, plastic molding.

At a front center portion of a top surface of the housing 71, a cross key 72a is provided. The cross key 72a is a cross-shaped four-direction push switch, and the operation portions thereof are respectively located on cross-shaped projecting portions arranged at intervals of 90 degrees such that the operation portions correspond to four directions (front, rear, right and left). A player selects one of the front, rear, right and left directions by pressing one of the operation portions of the cross key 72a. Through an operation of the cross key 72a, the player can, for example, indicate a direction in which a player character or the like appearing in a virtual game world is to move, or select an instruction from a plurality of choices.

The cross key 72a is an operation section for outputting an operation signal in accordance with the above-described direction input operation performed by the player, and such an operation section may be provided in another form. For example, the operation section may be such that four push switches are arranged in the cross directions and an operation signal is outputted by the player's pressing one of the four push switches. Further, in addition to the four push switches, a center switch may be provided at a center of the cross directions so as to provide an operation section compounded from four push switches and the center switch. Alternatively, the cross key 72a may be replaced with an operation section which includes an inclinable stick (so called a joystick) projecting from the top surface of the housing 71 and which outputs the operation signal in accordance with an inclining direction of the stick. Still alternatively, the cross key 72a may be replaced with an operation section which includes a disc-shaped member horizontally slidable and which outputs an operation signal in accordance with a sliding direction of the disc-shaped member. Still alternatively, the cross key 72a may be replaced with a touchpad.

Behind the cross key 72a on the top surface of the housing 71, a plurality of operation buttons 72b to 72g are provided. The operation buttons 72b to 72g are each an operation section for, when the player presses a head thereof, outputting an operation signal allocated thereto. For example, functions as a NO. 1 button, a NO. 2 button, an A button and the like are assigned to the operation buttons 72b to 72d. Further, functions as a minus button, a home button, a plus button and the like are assigned to the operation buttons 72e to 72g. Various operational functions are assigned to the operation buttons 72a to 72g in accordance with the game program to be executed by the game apparatus 3. In an exemplary arrangement shown in FIG. 3, the operation buttons 72b to 72d are arranged in a line at the center in a front-rear direction on the top surface of the housing 71. The operation buttons 72e to 72g are arranged in a line on the top surface of the housing 71 in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. A controller type (number) is assigned to the controller 7 such that the controller 7 is distinguishable from the other controllers 7. Here, the LEDs 702 are used for, e.g., informing the player of the controller type which is currently set for the controller 7. Specifically, when the controller 7 transmits transmission data to the game apparatus 3, one of the plurality of LEDs 702 which corresponds to the controller type of the controller 7 is lit up.

On the top surface of the housing 71, speaker holes for emitting a sound from a speaker (a speaker 706 of FIG. 5), which is to be described later, to outside are formed between the operation button 72b and the operation buttons 72e to 72g.

On a bottom surface of the housing 71, a recessed portion is formed. As described later in detail, the recessed portion is formed in a position in which an index finger or middle finger of the player is located when the player holds the controller 7 with one hand and points a front portion thereof to the markers 8L and 8R. On a slope surface of the recessed portion, an operation button 72i is provided. The operation button 72i is an operation section acting as, for example, a B button.

On a front side surface of the housing 71, an image pickup element 743 constituting a portion of an imaging information calculation section 74 is provided. The imaging information calculation section 74 is a system for analyzing image data picked up by the controller 7, thereby identifying an area having a high brightness in the image and detecting a position of a gravity center, a size and the like of the area. The imaging information calculation section 74 has, for example, a maximum sampling period of about 200 frames/sec, and therefore is capable of tracing and analyzing even a relatively fast motion of the controller 7. A configuration of the imaging information calculation section 74 will be described later in detail. On a rear side surface of the housing 71, a connector 73 is provided. The connector 73 is, for example, an edge connector, and is used for engaging and connecting the controller 7 with a connection cable.

For the sake of a specific description, a coordinate system set for the controller 7 will be defined. As shown in FIGS. 3 and 4, an x-axis, a y-axis, and a z-axis running at right angles to one another are defined with respect to the controller 7. Specifically, the z-axis represents a longitudinal direction of the housing 71, which corresponds to the front-rear direction of the controller 7, and a direction on the side of the front side surface (a portion on which the imaging information calculation section 74 is provided) of the controller 7 is set as a z-axis positive direction. Further, the y-axis represents an up-down direction of the controller 7, and a direction on the side of the top surface of the housing 71 is set as a y-axis positive direction. Still further, the x-axis represents the left-right direction of the controller 7, and a direction on the left side (a side which is not shown in FIG. 3, but shown in FIG. 4) of the housing 71 is set as an x-axis positive direction.

Figure 5:
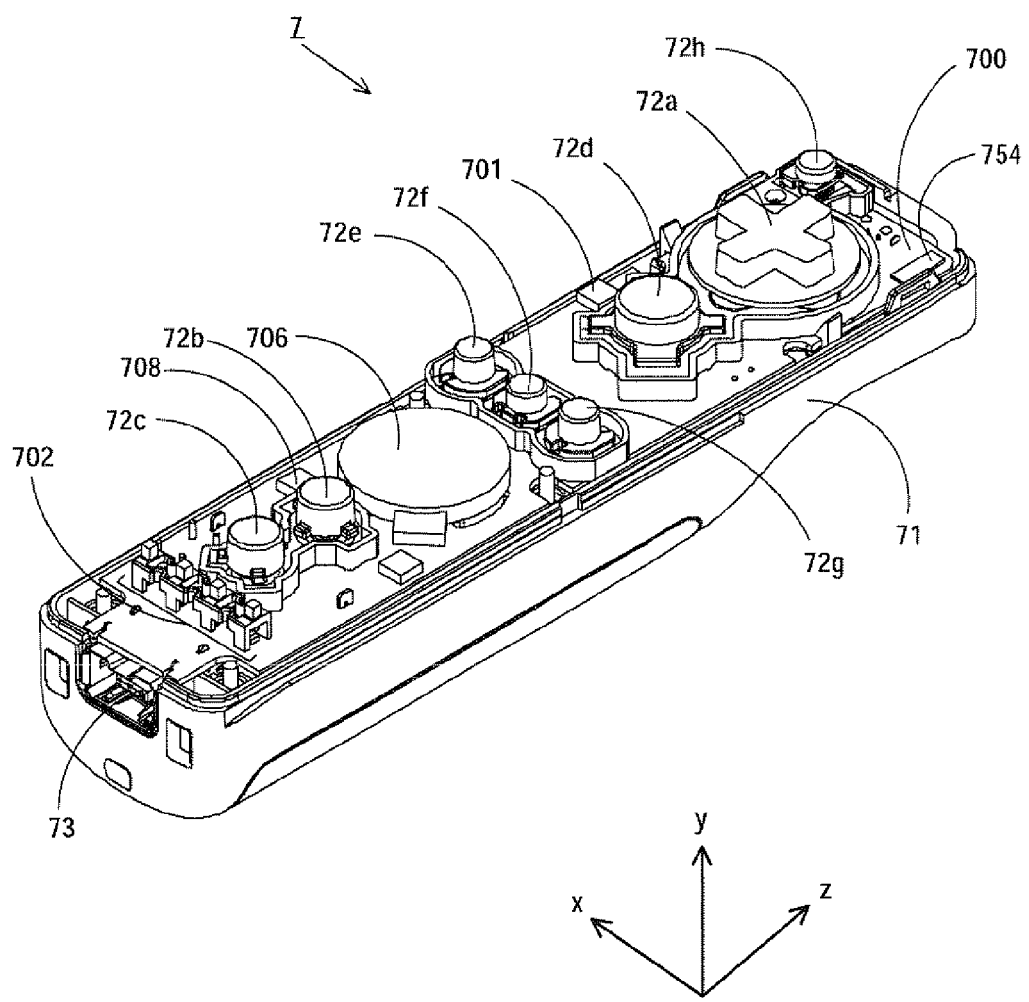
FIG. 5 is a perspective view of the controller 7 in a state where an upper casing thereof is removed.
Figure 6:
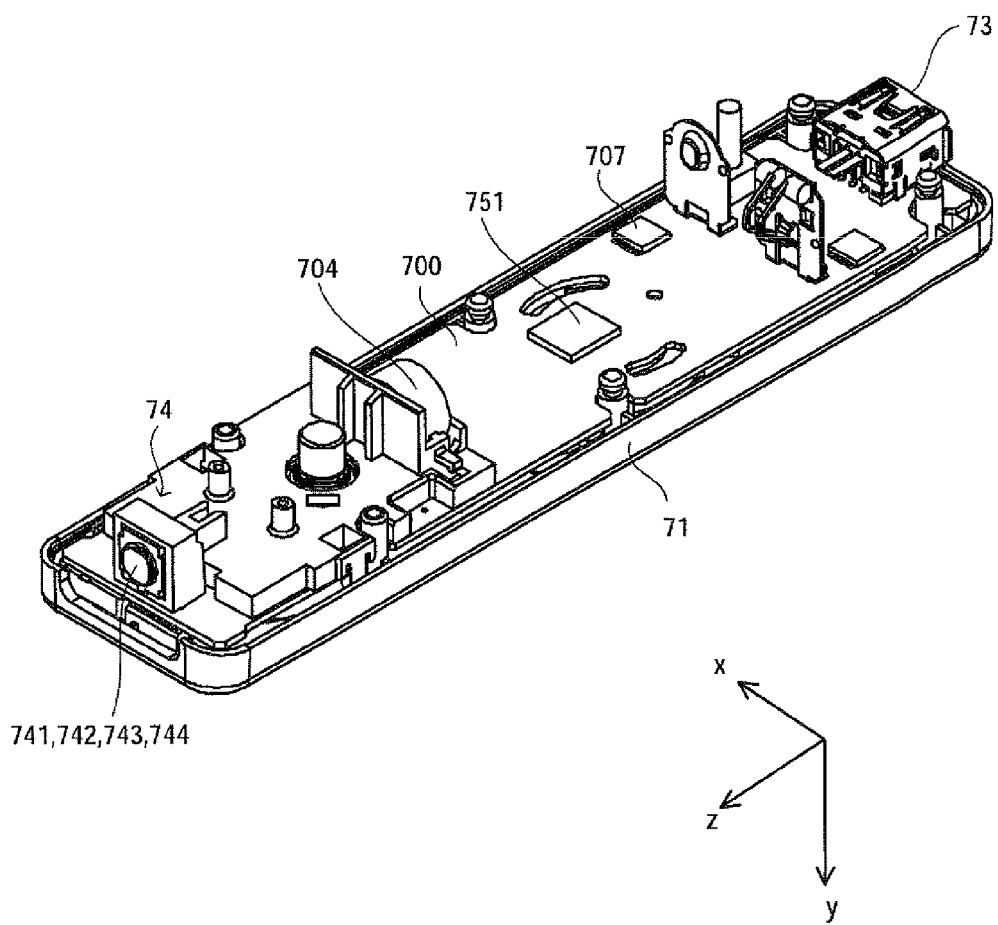
FIG. 6 is a perspective view of the controller 7 in a state where a lower casing thereof is removed.

With reference to FIGS. 5 and 6, an internal structure of the controller 7 will be described. FIG. 5 is a perspective view of the controller 7 in a state where an upper casing (a portion of the housing 71) of the controller 7 is removed. FIG. 6 is a perspective view of the controller 7 in a state where a lower casing (a portion of the housing 71) of the controller 7 is removed. FIG. 6 is a perspective view of a substrate 700 as viewed from a reverse side of the substrate 700 shown in FIG. 5.

As shown in FIG. 5, the substrate 700 is fixed inside the housing 71. Provided, on a top main surface of the substrate 700, are the operation buttons 72a to 72h, an acceleration sensor 701, the LEDs 702, an antenna 754 and the like. These elements are connected to a microcomputer 751 or the like (see FIGS. 6 and 7) bylines (not shown) formed on the substrate 700 or the like. A microcomputer 751 functions as exemplary button data generation means of the present invention, and generates operation button data corresponding to the type of the operation button 72a or the like. This function is a technique in the public domain, and realized by the microcomputer 751 detecting connection/disconnection of lines which are caused by a switch mechanism such as a tactile switch located at a lower side of a key top. More specifically, when the operation button, for example, is pressed, the lines are connected, and consequently energized. The microcomputer 751 detects the lines which are energized, and generates a signal corresponding to the type of the operation button.

The wireless module 753 (see FIG. 7) and antenna 754, which are not shown, allow the controller 7 to act as a wireless controller. A quartz oscillator, which is not shown, is provided in an inside of the housing 71, and generates a reference clock of the microcomputer 751 to be described later. On the top main surface of the substrate 700, a speaker 706 and an amplifier 708 are provided. The acceleration sensor 701 is provide at the left side of the operation button 72d on the substrate 700 (that is, at a peripheral portion, instead of a center portion, on the substrate 700). Accordingly, the acceleration sensor 701 is capable of detecting, from a rotation centering on the longitudinal direction of the controller 7, acceleration generated by a centrifugal force element as well as directional variation in gravity acceleration. Accordingly, the game apparatus 3 and the like are capable of detecting, from the detected acceleration data, the rotation of the controller 7 with a high sensitivity in accordance with a predetermined calculation.

As shown in FIG. 6, at a front edge of a bottom main surface of the substrate 700, the image information calculation section 74 is provided. The image information calculation section 74 includes an infrared filter 741, a lens 742, the image pickup element 743 and an image processing circuit 744 which are located in this order from the front side of the controller 7. These elements are attached to the bottom main surface of the substrate 700. At a rear edge of the bottom main surface of the substrate 700, the connector 73 is attached. Further, on the bottom main surface of the substrate 700, a sound IC 707 and the microcomputer 751 are provided. The sound IC 707 is connected to the microcomputer 751 and the amplifier 708 by lines formed on the substrate 700 and the like, and outputs an audio signal to the speaker 706 via the amplifier 708 in accordance with the sound data transmitted from the game apparatus 3.

On the bottom main surface of the substrate 700, a vibrator 704 is attached. The vibrator 704 may be, for example, a vibration motor or a solenoid. The vibrator 704 is connected to the microcomputer 751 by the lines formed on the substrate 700, and is turned on/off in accordance with vibration data transmitted from the game apparatus 3. The controller 7 is vibrated when the vibrator 704 is turned on, and vibration is conveyed to the player holding the controller 7. Thus, a so-called vibration-feedback game is realized. The vibrator 704 is located at a relatively front side of the housing 71, and thus the housing 71 vibrates to a large extent while the player is holding the housing 71, whereby the player feels vibration sensitively.

With reference to FIG. 7, an internal configuration of the controller 7 will be described. FIG. 7 is a block diagram illustrating a configuration of the controller 7.

As shown in FIG. 7, the controller 7 includes therein a communication section 75 as well as the above-described operation section 72, the imaging information calculation section 74, the acceleration sensor 701, the vibrator 704, the speaker 706, the sound IC 707, and the amplifier 708.

The image information calculation section 74 includes the infrared filter 741, the lens 742, the image pickup element 743 and the image processing circuit 744. The infrared filter 741 allows only an infrared radiation in the light incident on the front side of the controller 7 to pass therethrough. Note that the markers 8L and 8R, located on the periphery of the display screen of the television 2, are infrared LEDs which output infrared light forward from the television 2. Therefore, by providing the infrared filter 741, images of the respective markers 8L and 8R can be more accurately picked up. The lens 742 converges the infrared radiation which has passed through the infrared filter 741, and outputs the infrared radiation to the image pickup element 743. The image pickup element 743 is a solid-state image pickup element such as a CMOS sensor or a CCD, and picks up an image of the infrared radiation collected by the lens 742. In other words, the image pickup element 743 picks up the image of only the infrared radiation, which has passed through the infrared filter 741, and generates image data. The image data generated by the image pickup element 743 is processed by the image processing circuit 744. Specifically, the image processing circuit 744 processes the image data obtained by the image pickup element 743 so as to detect a high brightness portion therefrom, and outputs, to the communication section 75, processing result data representing a result of detecting position coordinates and an area of the high brightness portion. Note that the image information calculation section 74 is secured to the housing 71 of the controller 7, and an imaging direction of the controller 7 can be changed by changing an orientation of the housing 71 itself. Based on the processing result data outputted from the image information calculation section 74, a signal generated in accordance with the position and motion of the controller 7 can be obtained.

It is preferable that the controller 7 includes triaxial (x, y, and z-axes) acceleration sensor 701. The triaxial acceleration sensor 701 detects linear acceleration in three directions, i.e., an up-down direction, a left-right direction, and a front-rear direction. Further, in another embodiment, a biaxial accelerometer may be used which detects the linear acceleration in the up-down direction and the left-right direction (or any other paired direction) depending on a type of a control signal to be used for game processing. For example, the triaxial or biaxial acceleration sensor 701 may be of a type available from Analog Devices, Inc. or STMicroelectronics N.V. The acceleration sensor 701 may be of an electrostatic capacitance (capacitance-coupling) type which is based on silicon micro-machined MEMS (Micro Electro Mechanical Systems) technology. Any other suitable accelerometer technology (e.g., piezoelectric type or piezoresistance type) now existing or to be developed later may be used to provide the triaxial or biaxial acceleration sensor 701.

As one skilled in the art understands, accelerometers, as used in the acceleration sensor 701, are only capable of detecting acceleration along a straight line (linear acceleration) corresponding to each axis of the acceleration sensor. In other words, the direct output of the acceleration sensor 701 is limited to signals indicative of linear acceleration (static or dynamic) along the respective two or three axes thereof. As a result, the acceleration sensor 701 cannot directly detect motion along a non-linear (e.g. arcuate) path, rotation, rotational motion, angular displacement, tilt, position, posture or any other physical characteristic.

However, through processing by a computer such as a processor of a game apparatus (e.g., a CPU 10) or a processor of a controller (e.g., the microcomputer 751), in accordance with the acceleration signals outputted from the acceleration sensor 701, additional information relating to the controller 7 can be inferred or calculated (determined), as one skilled in the art will readily understand from the description herein. For example, in the case where processing is executed by a computer based on the assumption that a controller accommodating the acceleration sensor is in a static state (that is, in the case where it is only gravitational acceleration that is to be detected by the acceleration sensor), it is possible to understand whether or not, or to what extent, the controller is tilted toward the gravity direction in accordance with the detected acceleration as long as the controller is actually in a static state. Specifically, if a state where an axis to be detected by the acceleration sensor is facing a vertically downward direction is set as a standard state, it is possible to find out whether or not the axis to be detected is tilted depending on whether or not 1G (gravitational acceleration) is exerted, and also possible to find out the degree of tilt of the axis to be detected. Further, in the case of a multi-axial acceleration sensor, it is possible to find out, in detail, the degree of tilt of respective axes with respect to the gravity direction by processing the acceleration signals along the respective axes. In this case, the processor may calculate data of a tilt angle of the controller 7 in accordance with the output from the acceleration sensor 701, or alternatively infer an approximate tilt angle in accordance with the output from the acceleration sensor 701 without calculating data of the tilt angle. By using the acceleration sensor 701 and the processor in combination with each other in a manner as above described, it is possible to identify the tilt, an posture, and the position of the controller 7. On the other hand, in the case where it is assumed that the acceleration sensor is in a dynamic state, acceleration corresponding to the motion of the acceleration sensor can be detected, in addition to the gravitational acceleration element. Accordingly, as long as the gravitational acceleration element is removed through given processing, it is possible to calculate a motion direction and the like of the controller 7. Specifically, in the case where the controller 7 including the acceleration sensor 701 is dynamically accelerated and moved by a hand of a user, various motions and/or positions of the controller 7 can be calculated by processing the acceleration signal generated by the acceleration sensor 701. Even in the case where it is assumed that the acceleration sensor is in the dynamic state, it is possible to calculate a tilt toward the gravity direction as long as the acceleration corresponding to the motion of the acceleration sensor is removed through given processing. In another embodiment, the acceleration sensor 701 may include a built-in type signal processing apparatus or a dedicated processing apparatus of any other type so as to desirably process the acceleration signal to be outputted from an embedded accelerometer before outputted to the microcomputer 751. For example, in the case where the acceleration sensor is designed to detect static acceleration (e.g., gravitational acceleration), the built-in type or the dedicated processing apparatus may convert the detected acceleration signal into a tilt angle (or any other desirable parameter) corresponding thereto.

The communication section 75 includes the microcomputer 751, a memory 752, the wireless module 753 and the antenna 754. The microcomputer 751 controls the wireless module 753 for wirelessly transmitting the transmission data while using the memory 752 as a storage area at the time of processing. Further, the microcomputer 751 controls operation of the sound IC 707 and the vibrator 704 in accordance with the data received by the wireless module 753 from the game apparatus 3 via the antenna 754. The sound IC 707 processes the sound data and the like transmitted from the game apparatus 3 via the communication section 75. Further, the microcomputer 751 actuates the vibrator 704 in accordance with vibration data (e.g., a signal for turning the vibrator 704 "ON" or "OFF") and the like which is transmitted from the game apparatus 3 via the communication section 75.

Data from the controller 7 such as an operation signal (key data) from the operation section 72, acceleration signals (acceleration data in x-axis, y-axis, and z-axis directions, hereinafter simply referred to as "acceleration data") from the acceleration sensor 701, and the processing result data from the imaging information calculation section 74 are outputted to the microcomputer 751. The microcomputer 751 temporarily stores inputted data (the key data, the acceleration data and the processing result data) in the memory 752 as the transmission data which is to be transmitted to the wireless controller module 19. Wireless transmission from the communication section 75 to the wireless controller module 19 is performed at predetermined time intervals. Because the game processing is generally executed at a cycle of 1/60 sec, the wireless transmission needs to be performed at a cycle of a shorter time period. Specifically, the game processing is executed at a cycle of 16.7 ms (1/60 sec), and a transmission interval of the communication section 75 which is composed of the Bluetooth (registered trademark) is 5 ms, for example. At a timing of performing a wireless transmission to the wireless controller module 19, the microcomputer 751 outputs, to the wireless module 753, the transmission data stored in the memory 752 as a series of pieces of operation information. The wireless module 753 uses, for example, the Bluetooth (registered trademark) technology so as to modulate the series of pieces of operation information by using a carrier wave having a predetermined frequency and to emit the modulated radio signal from the antenna 754. Thus, the key data from the operation section 72, the acceleration data from the acceleration sensor 701, and the processing result data from the imaging information calculation section 74 which are all provided in the controller 7 are modulated by the wireless module 753 into the radio signal, and then transmitted from the controller 7. The wireless controller module 19 of the game apparatus 3 receives the radio signal, and the game apparatus 3 demodulates or decodes the radio signal to obtain the series of pieces of operation information (the key data, the acceleration data and the processing result data). In accordance with the series of pieces of obtained operation information and the game program, the CPU 10 of the game apparatus 3 executes the game processing. In the case where the communication section 75 is configured by using the Bluetooth (registered trademark) technology, the communication section 75 may have a function of receiving transmission data which is wirelessly transmitted from the other devices.

Figure 8:
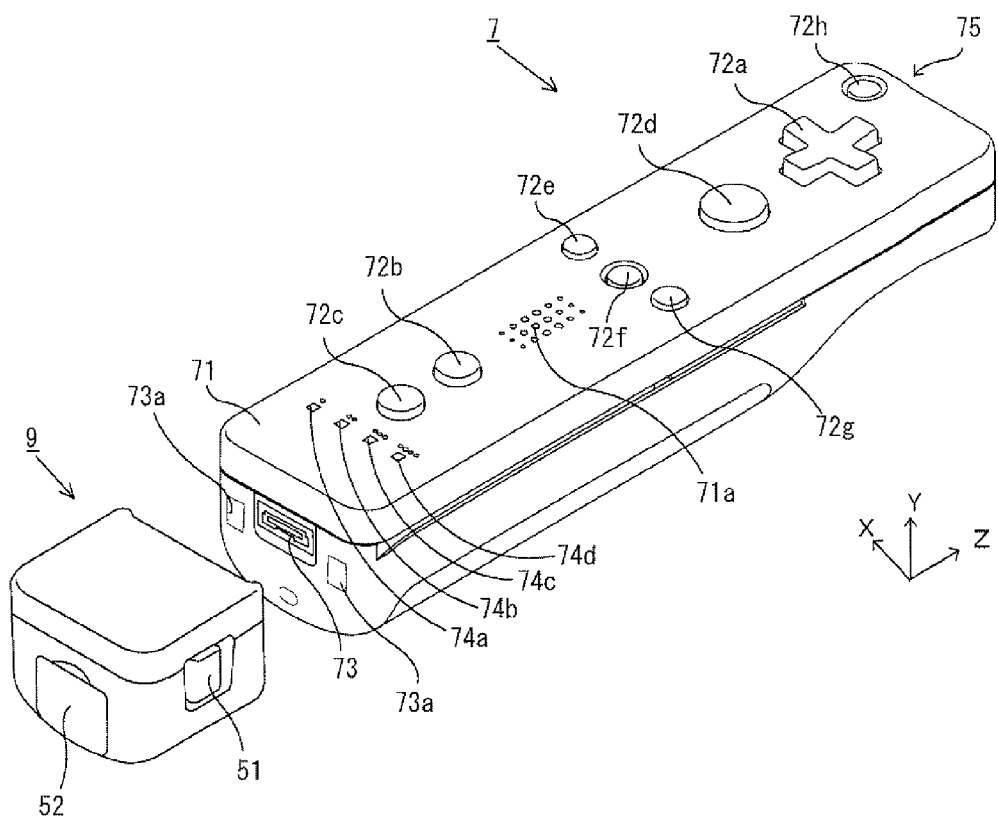
FIG. 8 is a perspective view of the controller 7 and a gyro sensor 9.

In the present embodiment, as a motion sensor for detecting the motion of the controller 7, an expansion unit including a gyro sensor (hereinafter referred to as "gyro sensor unit") is detachable from the controller 7. FIG. 8 is a diagram illustrating the controller 7 and a gyro sensor unit 9. The gyro sensor unit 9 has a gyro sensor for detecting angular rates about three axes (gyro sensors 55 and 56 shown in FIG. 9). The gyro sensor unit 9 is detachably inserted to the connector 73 of the controller 7. A plug connectable to the connector 73 (a plug 53 shown in FIG. 9) is provided at a front end of the gyro sensor unit 9 (an end on the Z-axis positive direction side shown in FIG. 8). Furthermore, hooks (not shown) are provided at both ends of the plug 53. In a state where the gyro sensor unit 9 is inserted to the controller 7, the plug 53 is connected to the connector 73 and the hooks are locked into locking holes 73a of the controller 7. Thus, the controller 7 is firmly secured to the gyro sensor unit 9. Furthermore, a button 51 is provided on a side face (a face perpendicular to the X-axis direction shown in FIG. 8) of the gyro sensor unit 9. The button 51 is formed such that when the button 51 is pressed, a state where the hooks are locked into the locking holes 73 is released. Therefore, by disconnecting the plug 53 from the connector 73 while the button 51 is pressed, the gyro sensor unit 9 is detached from the controller 7. In another embodiment, the controller 7 may include a gyro sensor.

At the rear end of the gyro sensor unit 9, provided is a connector having the same shape as that of the connector 73. Therefore, any other apparatuses insertable to (the connector 73 of) the controller 7 are also insertable to the connector of the gyro sensor unit 9. Note that in FIG. 8, a cover 52 is detachably attached to the connector.

Figure 9:
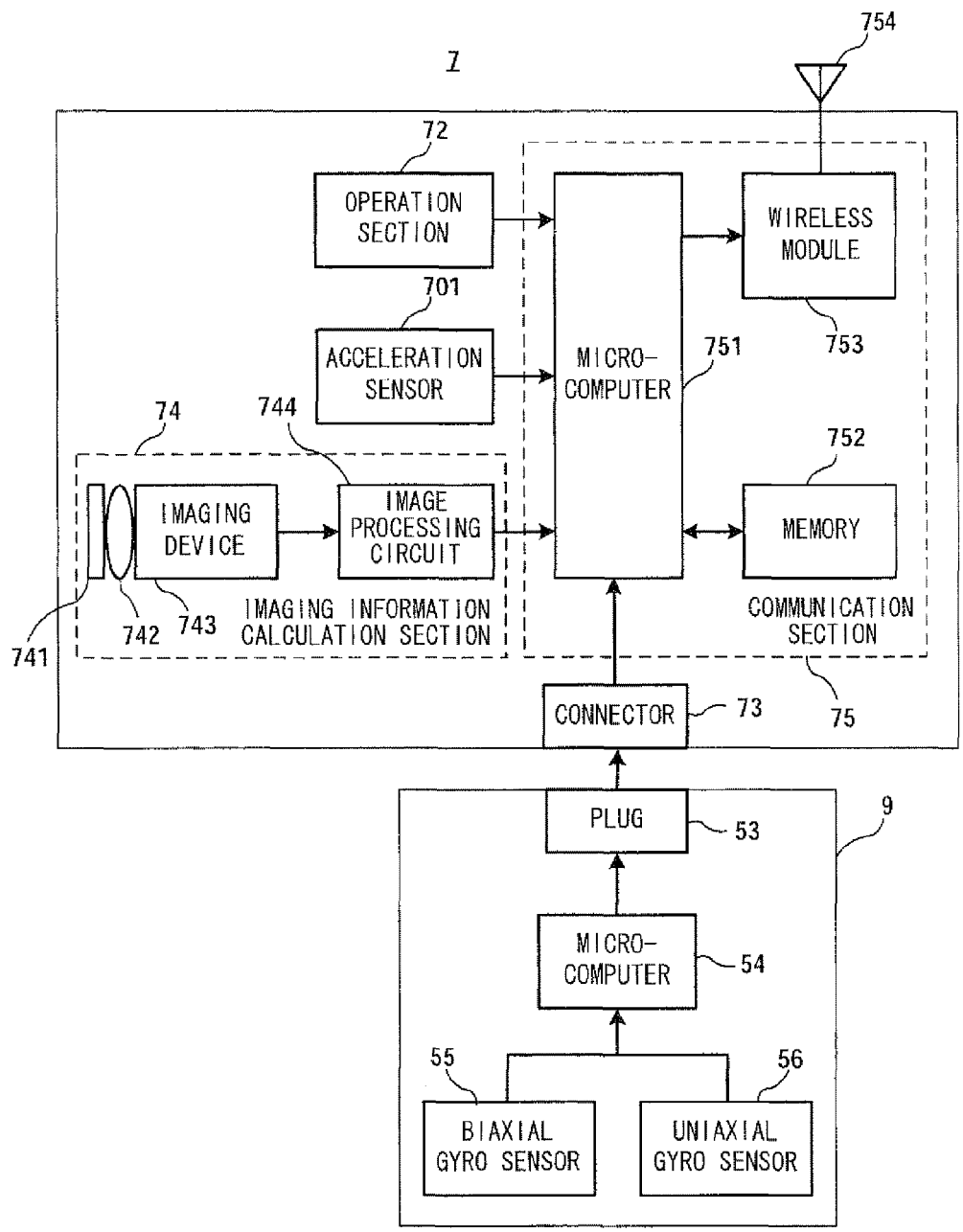
FIG. 9 is a block diagram illustrating configurations of the controller 7 and the gyro sensor 9.

FIG. 9 is a block diagram illustrating configurations of the controller 7 and the gyro sensor unit 9 in a state where the gyro sensor unit 9 is inserted to the controller 7. The gyro sensor unit 9 includes the plug 53, a microcomputer 54, a biaxial gyro sensor 55, and a uniaxial gyro sensor 56. As described above, the gyro sensor unit 9 detects angular rates about three axes (X, Y and Z-axes in the present embodiment) and transmits data representing the detected angular rates (angular rate data) to the controller 7.

The biaxial gyro sensor 55 detects the angular rates (per unit time) about the X-axis and the Y-axis. Also, the uniaxial gyro sensor 56 detects the angular rate (per unit time) about the X-axis. Note that in the present application, rotation directions about the respective X, Y and Z-axes with respect to the imaging direction of the controller 7 (the X-axis positive direction) are referred to as "roll direction", "pitch direction" and "yaw direction". That is, the biaxial gyro sensor 55 detects the angular rates in the roll direction (the rotation direction about the X-axis) and the pitch direction (the rotation direction about the Y-axis), and the uniaxial gyro sensor 56 detects the angular rate in the yaw direction (the rotation direction about the Z-axis).

In the present embodiment, the biaxial gyro sensor 55 and the uniaxial gyro sensor 56 are used to detect the angular rates about the three axes. In another embodiment, however, any number or any combination of gyro sensors may be used as long as the angular rates about the three axes are detected.

Furthermore, in the present embodiment, the three axes about which the gyro sensors 55 and 56 detect the angular rates are set so as to correspond, respectively, to the three axes along which the acceleration sensor 37 detects the acceleration (the X, Y and Z-axes). In another embodiment, however, the three axes about which the gyro sensors 55 and 56 detect the angular rates may not correspond, respectively, to the three axes along which the acceleration sensor 37 detects the acceleration.

The data representing the angular rates detected by the gyro sensors 55 and 56 is outputted to the microcomputer 54. Therefore, data representing the angular rates about the three axes (X, Y and Z-axes) is inputted to the microcomputer 54. The microcomputer 54 transmits the data representing the angular rates about the three axes to the controller 7 via the plug 53 as the angular rate data. Note that the transmission from the microcomputer 54 to the controller 7 is performed at a cycle of a predetermined time period. However, a game processing is generally executed at a cycle of 1/60 sec (on a frame-by-frame basis). Therefore, the transmission from the microcomputer 54 to the controller 7 is preferably performed at a cycle of a shorter time period.

Next, with reference to FIGS. 10 to 16, an outline of the game processing executed in the present embodiment will be described. A game assumed in the present embodiment is an action adventure game. In this game, a player operates a player character in a virtual game space (which may be a two-dimensional virtual space or a three-dimensional virtual space) so as to proceed with a game along a predetermined scenario which is previously set by a game developer.

Figure 10:
FIG. 10 shows an exemplary game screen assumed in the present invention.

FIG. 10 is a diagram illustrating a title menu of the game assumed in the present embodiment. In the title menu of FIG. 10, two items, "play with scenario" and "play with chapter" are displayed. "Play with scenario" is an item for playing a game in a similar manner as that of a general game. "Play with chapter" is an item for playing a game on a "chapter-by-chapter" basis, dividing a scenario of the game into several chapters.

Figure 11:
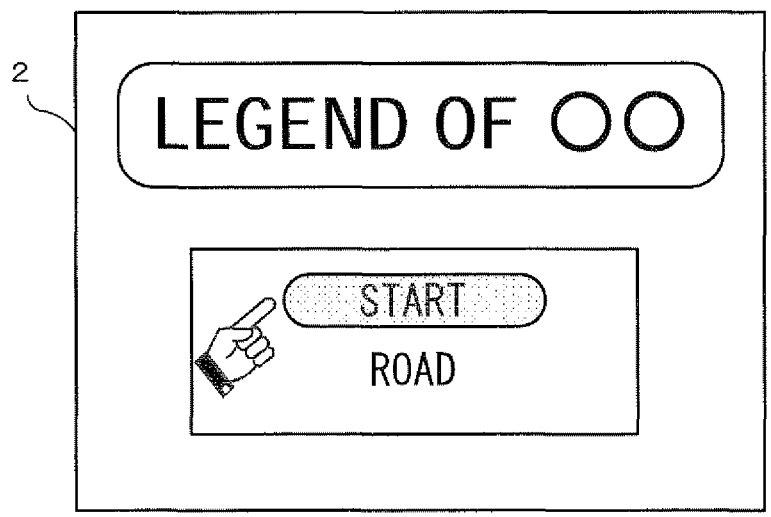
FIG. 11 shows an exemplary game screen assumed in the present invention.
Figure 12:
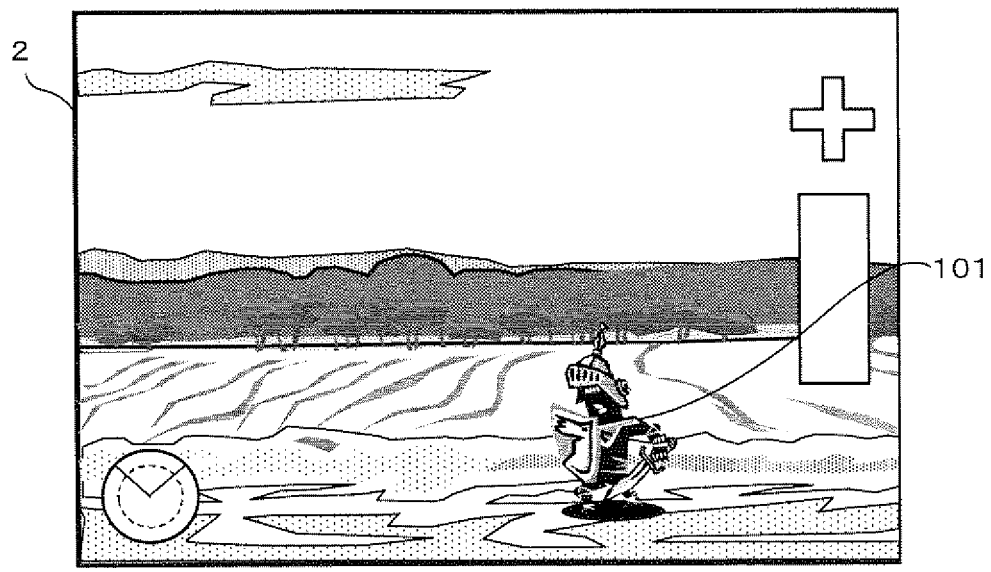
FIG. 12 shows an exemplary game screen assumed in the present invention.

A process to be executed when "play with scenario" is selected from the aforementioned title menu will be described. When the player selects "play with scenario" from the title menu, a screen having two items, "start" and "road" shown in FIG. 11 is displayed. When the player selects "start" on this screen, he or she can start the game from the beginning of the scenario thereof. On the other hand, when the player selects "road", he or she can play the game from a point continued from the previous play (i.e., from a midpoint of the scenario) by reading save data. Thereafter, in both cases, the game processing is executed based on an operation of the player using the controller 7. Specifically, based on such operation information transmitted from the controller 7, a process in which the player character performs various actions in a virtual space is executed. FIG. 12 shows an exemplary game screen to be displayed when the player selects "play with scenario". In FIG. 12, a state of the virtual game space existing a player character 101 is displayed by using an entirety of the screen.

Figure 13:
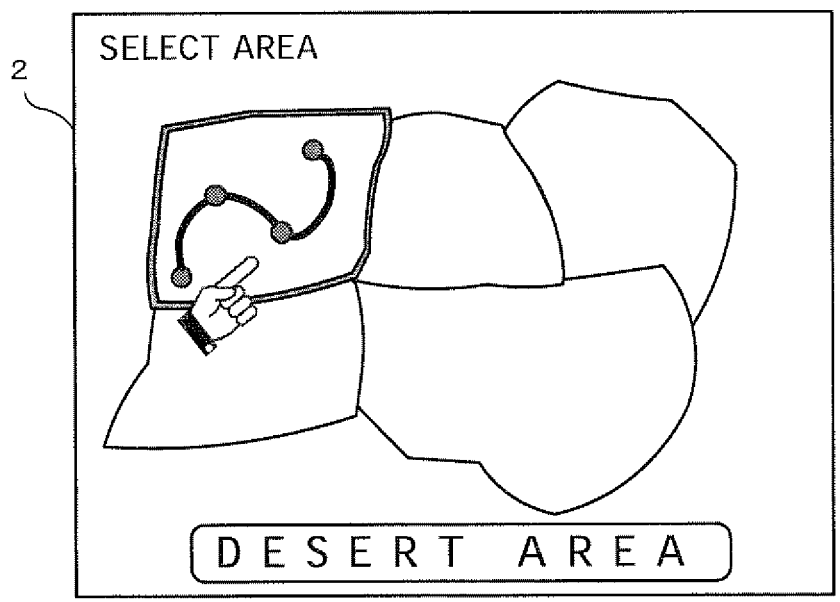
FIG. 13 shows an exemplary game screen assumed in the present invention.

Next, an outline of a process to be executed when the player selects "play with chapter" from the title menu shown in FIG. 10 will be described. FIG. 13 shows an exemplary screen to be displayed when "play with chapter" is selected. In FIG. 13, a reduced map of a virtual world, where the game is played, is displayed. The virtual world of the game assumed in the present embodiment is divided into a plurality of areas. In FIG. 13, the virtual world is divided into five areas, and the scenario of the game assumed in the present embodiment proceeds by the player character sequentially visiting these five areas counterclockwise from the upper right. Furthermore, a scenario corresponding to each of the areas is composed of a plurality of chapters.

Figure 14:
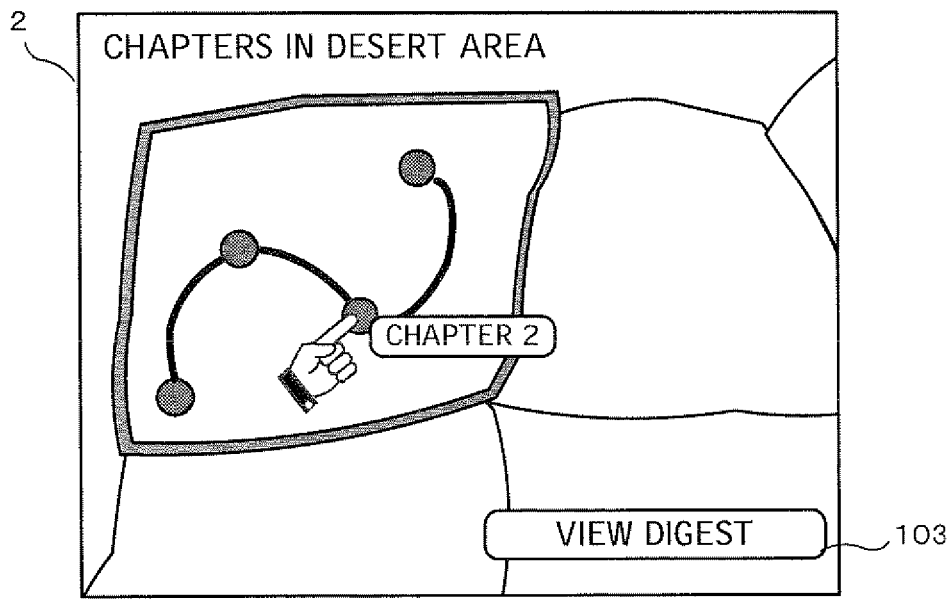
FIG. 14 is a view describing an outline of a process executed in the present embodiment.

In FIG. 13, when the player selects an area displayed at the upper left (hereinafter referred to as "desert area"), the screen changes accordingly so as to display an enlarged desert area, as shown in FIG. 14. In FIG. 14, a plurality of chapters constituting the desert area are displayed. In an example of FIG. 14, the desert area is composed of four chapters. Specifically, the chapters are represented by circles, and the circles are connected to each other with a single line so as to show a route through which the player conquers the desert area (how the scenario proceeds to) when "play with scenario" is selected. The player can select a desired chapter from among the four chapters (when the player places a cursor on each of the circles, a chapter name corresponding to each of the circles is displayed.

Furthermore, in FIG. 14, a button 103 indicating "view digest" is displayed at the lower right of the screen. When the player presses the button 103, a digest movie for introducing a digest of a scenario content of the desert area is displayed. In the digest movie, a moving image file which is previously created (a moving image file in an MPEG format, for example) is reproduced.

Figure 15:
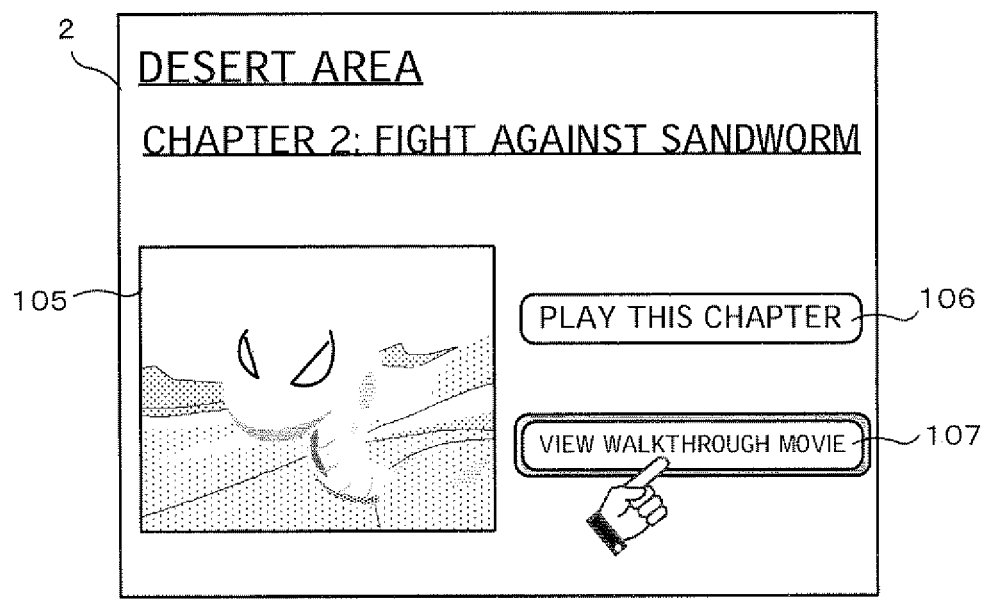
FIG. 15 shows an exemplary game screen assumed in the present invention.

It is assumed that the player selects a second chapter from the right (hereinafter referred to as a "chapter 2") on the screen of FIG. 14. In this case, a chapter menu shown in FIG. 15 is displayed. In FIG. 15, two buttons, i.e., a "play this chapter" button 106 and a "view walkthrough movie" button 107, are displayed together with an illustration 105 representing a content of the chapter 2. When the player presses the "play this chapter" button 106 on the screen of FIG. 15, he or she can play the game from the beginning of the chapter 2. In this case, the player character 101 performs an action based on an operation of the player.

Figure 16:
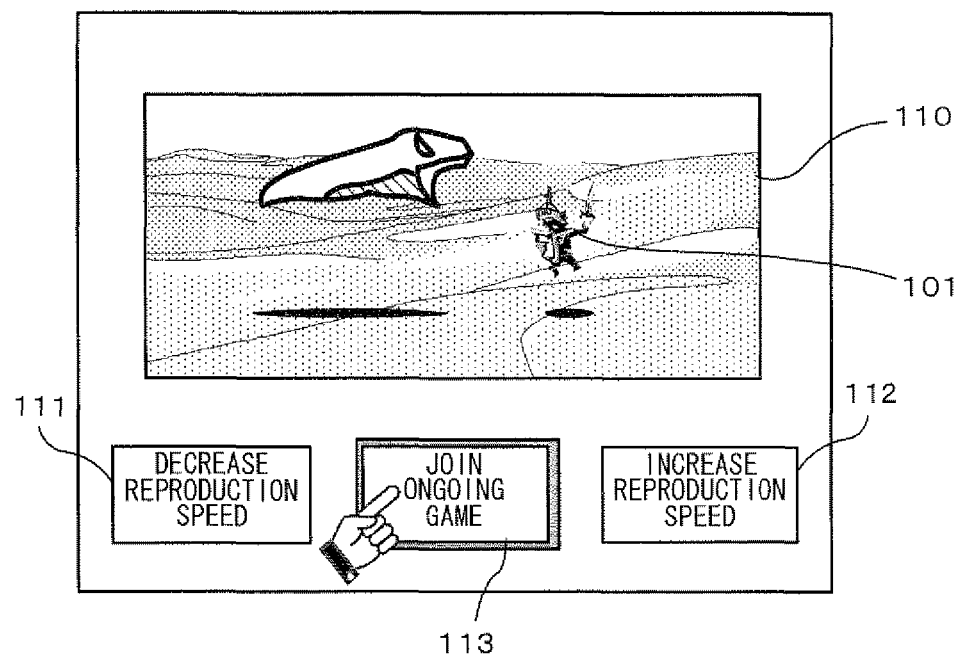
FIG. 16 shows an exemplary game screen assumed in the present invention.

On the other hand, when the player presses the "view walkthrough movie" button 107 on the screen of FIG. 15, a game screen changes to a screen as shown in FIG. 16, and a walkthrough movie, which is a moving image representing a method of conquering the chapter 2, is displayed. The present embodiment illustrates an example where a moving image representing a method of defeating a "sandworm" which is a boss character of the chapter 2 is displayed (it is assumed that a battle against the boss character is a scene where the player is likely to get stuck in the game). Specifically, a moving image representing a state where the player fights against (and finally beats) the "sandworm" is displayed in a walkthrough movie display area 110. This walkthrough movie is a moving image to be displayed by the CPU 10 operating the player character 101 based on the operation information which is previously provided (hereinafter referred to as "automatic operation data). In other words, such a walkthrough movie is a moving image to be displayed by reproducing the automatic operation data.

Here, the automatic operation data will be described. As described above, the automatic operation data is the operation information which is previously created. For example, in the development stage of the game, a game developer or the like actually operates the player character 101 using the controller 7, and then stores the operation information transmitted from the controller 7 to the game apparatus 3 in a predetermined memory. The operation information thus obtained to be stored on the optical disc 4 as a portion of game data will be used as the automatic operation data. Note that the details of the automatic operation data will be described later.

Furthermore, in FIG. 16, instead of the entirety of the screen as shown in FIG. 12, an area smaller than that of the entirety of the screen is used as the walkthrough movie display area 110. Buttons 111 and 112 for changing a reproduction speed of the walkthrough movie are also displayed on the screen. In the present embodiment, a reproduction speed can be changed in eight stages from 1× to 8×. When the player presses the button 112, the reproduction speed is increased by one times (one stage) (e.g., the reproduction speed changes from 1×→2×→3× . . . →8×), and when the player presses the button 111, the reproduction speed is decreased by one times (e.g., the reproduction speed changes from 8×→7×→6× . . . →1×).

Figure 17:
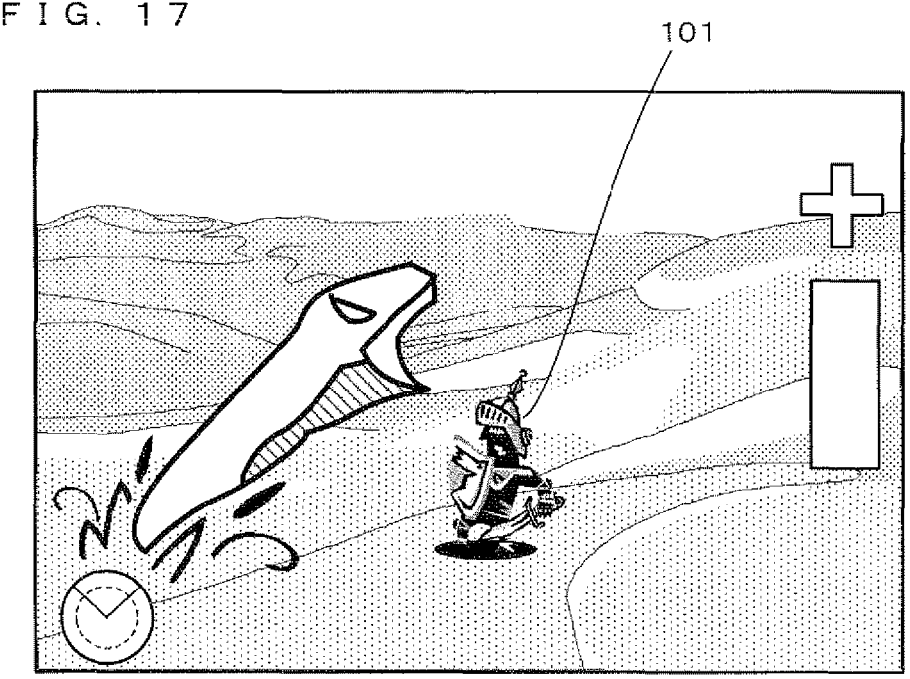
FIG. 17 shows an exemplary game screen assumed in the present invention.

Furthermore, a "join ongoing game" button 113 is displayed on the screen of FIG. 16. In the game assumed in the present embodiment, by pressing the "join ongoing game" button 113 while the walkthrough movie is displayed, an operation of the player character 101 can be switched from an operation performed by the CPU 10 based on the automatic operation data to an operation of the player using the controller 7. After the switching, a state of the player character is shifted from a state immediately before the switching is performed. Further, a state of an item or the like is also shifted from a state immediately before the switching is performed. That is, while a walkthrough movie is reproduced based on the automatic operation data, the player can "join an ongoing game from a mid-game point therefrom". Furthermore, the player "joins an ongoing game from a mid-game point therefrom", thereby causing the game screen to be switched over to the same screen as that to be displayed when "play with scenario" is selected, i.e., a screen on which a state where the virtual game space existing the player character 101 is displayed by using the entirety of the screen, as shown in FIG. 17. Thereafter, the player can play the game until the chapter 2 is finished, moving the player character 101 in accordance with his or her own operation.

As described above, a scenario of a game is divided into a plurality of chapters, thereby allowing the player to play the game all the way through (until the game is cleared or to the end of the game) even if he or she does not have much time to play the game. Furthermore, by displaying the aforementioned walkthrough movie for each of the chapters, it becomes possible to prevent the player from getting stuck in the game. Therefore, even if the player is unfamiliar with the game, he or she can enjoy playing the game all the way through (until the game is cleared or to the end of the game). Furthermore, a mode of "play with scenario" and a mode of "play with chapter" are individually provided. Thus, if the player wishes to clear the game by himself or herself, the mode of "play with scenario" may be selected to play the game, whereby he or she never discovers a method of conquering the game in advance and lose interest in the game.

Furthermore, the CPU 10 operates the player character 101 based on the automatic operation data so as to display a state of the player character controlled based on the automatic operation data as the walkthrough movie, thereby making it possible to smoothly switch over an operation of the player character 101 to the operation performed by the player from any mid-game point of the walkthrough movie being currently reproduced. Thus, while viewing a walkthrough movie, the player can start to operate the player character 101 by himself or herself from any desired point thereof. In an example of the walkthrough movie of the "chapter 2" mentioned above, for example, the player is allowed to continue to view a walkthrough moving image displayed based on the automatic operation data until a certain mid-game point in the fight against the boss character and then start to operate the player character by himself or herself only when the player character delivers the final blow. In other words, the player is allowed to cause the CPU 10 to operate the player character 101 based on the automatic operation data for scenes including operations difficult for the player, and then start to operate the player character 101 by himself or herself after such scenes are over. As a result, even if the player is unfamiliar with the game, he or she can enjoy playing the game all the way through to the end.

Next, the game processing to be executed by the game apparatus 3 will be described in detail. Initially, data stored in the external main memory 12 when the game processing is executed will be described. FIG. 18 is a diagram illustrating a memory map of the external main memory 12 of the game apparatus 3. In FIG. 18, the external main memory 12 includes a program storage area 120 and a data storage area 123. Data stored in the program storage area 120 and the data storage area 123 is stored on the optical disc 4. When a game program is executed, the data stored in the above areas is forwarded to the external main memory 12 and stored therein.

The program storage area 120 stores the game program to be executed by the CPU 10, and the game program includes a main processing program 121, a walkthrough movie reproduction program 122 and the like.

The data storage area 123 stores walkthrough movie data 124, object data 125 and the like.

The walkthrough movie data 124 is data from which the aforementioned walkthrough movie is to be created. The walkthrough movie data 124 includes Area-1 data 1241 to Area-5 data 1245, each piece of the area data corresponding to a scenario content of the game assumed in the present embodiment. Furthermore, in each piece of the area data, at least one piece of data (Chapter-1 data 1241a, Chapter-2 data 1241b . . . ), having a number equal to the number of chapters constituting each area, is stored. Hereinafter, the at least one piece of data is generically referred to as "Chapter-m data" (m is a chapter number).

Figures 19, 20:
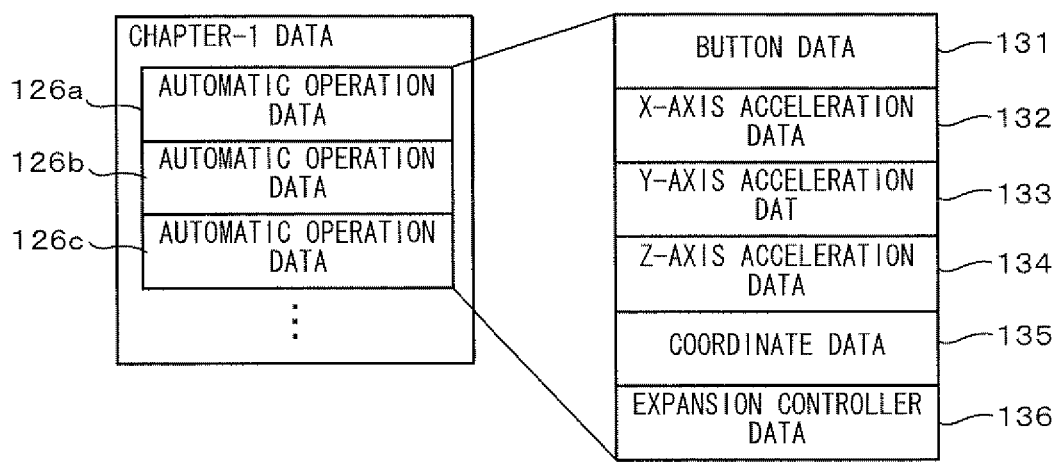
FIG. 19 is a diagram illustrating exemplary Chapter-m data shown in FIG. 16.
FIG. 20 is a diagram illustrating an exemplary configuration of button data 131.

FIG. 19 is a diagram illustrating a content of the Chapter-1 data 1241a, which is an example of the Chapter-m data. In FIG. 19, the Chapter-1 data 1241a includes a plurality of pieces of automatic operation data 126 (although the plurality of pieces of automatic operation data 126 are shown in FIG. 19 as 126a, 126b, 126c . . . , these pieces of data are generically referred to as the "automatic operation data 126" in the present embodiment). As described above, the automatic operation data 126 is previously provided data. Specifically, the automatic operation data 126 is data which is previously created by storing the operation information transmitted from the controller 7 when a game developer actually operates the controller 7 to play the game in the development stage of the game, for example. In the present embodiment, the operation information is outputted from the controller 7 at a cycle of 5 ms. Similarly, the automatic operation data 126 is also stored at a cycle of 5 ms. Specifically, the automatic operation data 126 contains data corresponding to 5 ms.

Next, a content of the automatic operation data 126 will be described. The automatic operation data 126 includes button data 131, X-axis acceleration data 132, Y-axis acceleration data 133, Z-axis acceleration data 134, coordinate data 135 and expansion controller data 136.

The button data 131 is data indicating a depression state of each of the buttons (the plurality of operation buttons) of the operation section 72 included in the controller 7. FIG. 20 is a diagram illustrating an exemplary configuration of the button data 131. The button data 131 includes a button type 1311 and a depression state 1312. The button type 1311 indicates each of the buttons of the operation section 72. The depression state 1312 indicates a depression state (an on/off state) of each of the buttons. Specifically, "0" indicates a state where a button is not pressed (where a button is turned off), and "1" indicates a state where a button is pressed (where a button is turned on). An example of FIG. 20 shows a state where only the "right" portion of the cross key 72a and the B button 72i are pressed.

Referring back to FIG. 19, the X-axis acceleration data 132, the Y-axis acceleration data 133 and the Z-axis acceleration data 134 are three pieces of data, detected by the acceleration sensor 701, of an X-axis component, a Y-axis component and a Z-axis component, respectively. A motion of the controller 7 can be detected by using these pieces of data. Thus, these pieces of data are used as the automatic operation data, thereby making it possible to reproduce even an operation using acceleration, more specifically, an operation of waving the controller 7 as the walkthrough movie.

The coordinate data 135 is data calculated based on the processing result data outputted from the image information calculation section 74. The coordinate data 135 is data of coordinates indicating positions of imaging targets (markers 8L and 8R) in a coordinate system for indicating a position on a plane corresponding to a picked-up image picked up by the image pickup element 743. The coordinates are varied in accordance with an orientation (posture) or a position of the controller 7, thereby allowing the game apparatus 3 to calculate an orientation or a position of the controller 7 by using the coordinate data.

Figure 21:
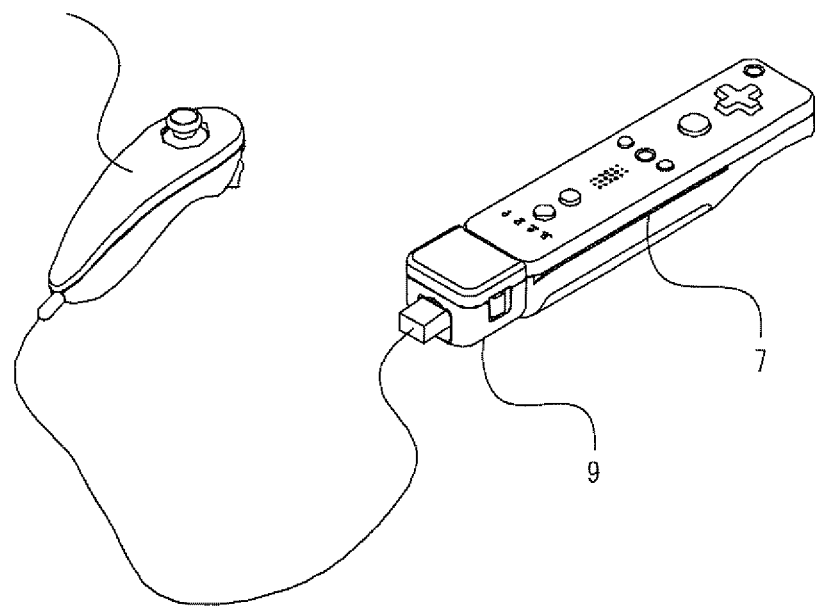
FIG. 21 is a view illustrating a state where the gyro sensor unit 9 and an expansion controller are connected to the controller 7.

The expansion controller data 136 is various data outputted from an expansion controller (e.g., a controller to which a direction can be inputted in analog form) and/or an expansion unit (e.g., the gyro sensor unit 9), which is/are insertable to the controller 7 via the connector 73. For example, in the case where the automatic operation data is generated in the development stage, data such as data representing the angular rates (yaw, roll and pitch) is stored when the gyro sensor unit 9 is inserted to the controller 7. Alternatively, when no component is inserted to the connector 73, no data is stored in the expansion controller data 136. Still alternatively, when both an expansion controller and an expansion unit are connected to the controller 7, output data of the expansion controller and output data of the expansion unit are alternately outputted. For example, as shown in FIG. 21, in the case where the gyro sensor unit 9 is inserted to the controller 7 and an expansion controller is further inserted to the gyro sensor unit 9, data of the gyro sensor unit 9 and data of the expansion controller are alternately outputted from the controller 7 to the game apparatus 3 on a frame-by-frame basis, for example. As a result, as the content of the expansion controller data 136, the data of the gyro sensor unit 9 and the data of the expansion controller are alternately replaced with each other on a frame-by-frame basis. In this case, the output data of each of the expansion controller and the gyro sensor unit 9 includes identification information for distinguishing between the two components.

Referring back to FIG. 18, the object data 125 is data regarding the player character 101 or an enemy character appearing in the game.

In addition to the data mentioned above, the data storage area 123 stores data necessary to execute the game processing such as data regarding a virtual game space (topographic data, for example).

Next, with reference to FIG. 22, the game processing to be executed by the game apparatus 3 will be described. When the game apparatus 3 is powered on, the CPU 10 of the game apparatus 3 executes a boot program stored in the ROM/RTC 13 so as to initialize each unit such as the external main memory 12. The game program stored on the optical disc 4 is loaded to the external main memory 12 and the CPU 10 starts to execute the game program. Note that in a flowchart shown in FIG. 22, the present embodiment describes only the game processing relating to a walkthrough movie reproduction process to be executed when the "view walkthrough movie" button 107 is pressed from the chapter menu shown in FIG. 15, and the detailed description of other game processing which does not directly pertain to the present invention will be omitted. A processing loop of steps S1 to S13 as shown in FIG. 22 is repeatedly executed on a frame-by-frame basis (every 1/60 sec).

An outline of the walkthrough movie reproduction process shown in FIG. 22 will be described. In the walkthrough movie reproduction process, a process is executed so as to change the number of pieces of automatic operation data 126 to be read during a processing loop executed once per frame in accordance with a reproduction speed designated by the player. Then, the CPU 10 operates the player character 101 based on the pieces of automatic operation data 126 having been read, and a process of rendering a state of the virtual game space, which is obtained as a result of the above operation is executed. Thereafter, when the "join ongoing game" button 113 is pressed, a control of the player character 101 is switched over to an operation inputted by the player (an operation signal outputted from the controller 7), and the walkthrough movie reproduction process is to be finished.

Figure 22:
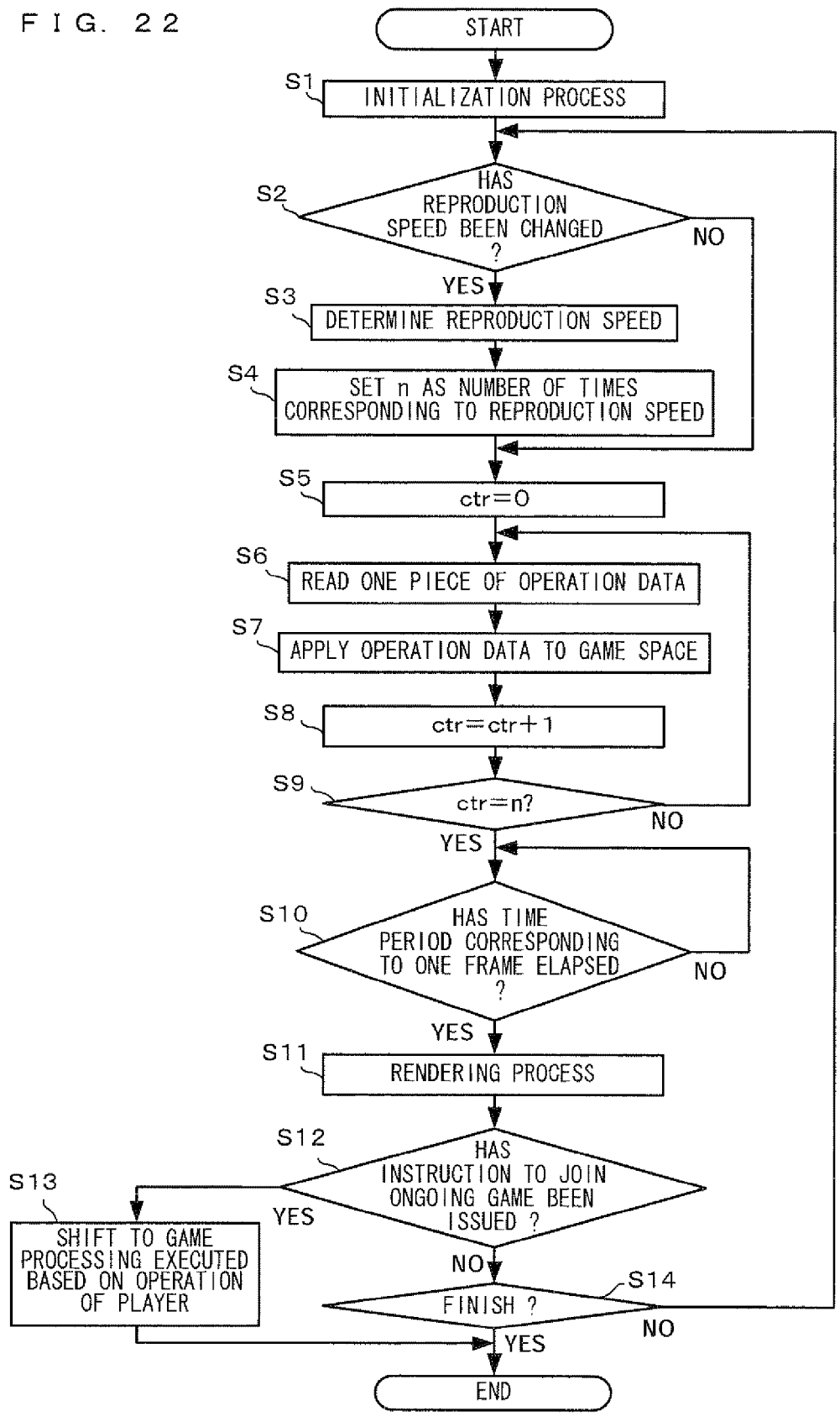
FIG. 22 is a flowchart illustrating the details of a game processing according to the present embodiment of the present invention.

In FIG. 22, the CPU 10 firstly executes an initialization process (step S1). Specifically, the CPU 10 reads data of a stage corresponding to each chapter designated by the player (topographic data or the like), data of various characters (the enemy character and other non-player characters), and item data necessary to reproduce a walkthrough movie (data of weapons with which the player character 101 is armed or data of items necessary to release "riddles", "tricks", "traps" or the like). Then, the item data having been read is set for the player character 101. For example, the player character 101 is set so as to be armed with a specific weapon for defeating the boss character. Thereafter, the CPU 10 generates a screen as shown in FIG. 16 and displays the generated screen. Furthermore, the CPU 10 specifies the Chapter-m data corresponding to an area and a chapter designated by the player, thereby making preparations for reading the specified Chapter-m data. Furthermore, the CPU 10 initializes a variable n. The variable n indicates the number of times a process (to be described later) of reading the operation data and adopting the read operation data to the game space is executed. Furthermore, the CPU 10 sets "1" as a variable S which indicates a reproduction speed. That is, 1× (a normal speed) is set as a reproduction speed in the initialization process.

Next, the CPU 10 determines whether an instruction to change a reproduction speed has been issued or not (step S2). Specifically, the CPU 10 determines whether the button 111 or 112 has been pressed on the screen shown in FIG. 16 for changing the reproduction speed. As a result of the determination, when an instruction to change the reproduction speed has not been issued (NO in step S2), the CPU 10 advances the process to step S5 to be described later.

On the other hand, as a result of the determination in step S2, when an instruction to change a reproduction speed has been issued, the CPU 10 determines the reproduction speed based on the instruction having been issued (step S3). Specifically, when the button 112 is pressed, a process of increasing the reproduction speed by one times is executed. On the other hand, when the button 111 is pressed, a process of decreasing the reproduction speed by one times is executed. For example, when the button 112 is pressed in a state where "1" is set as the variable S, "2" is to be set as the variable S (the reproduction speed is increased by one stage). Alternatively, when the button 111 is pressed in a state where "2" is set as the variable S, "1" is to be set as the variable S (the reproduction speed is decreased by one stage). Note that when the button 111 is pressed in a state where "1" is set as the variable S, the variable S remains unchanged because the reproduction speed is already at the lowest level. Similarly, when the button 112 is pressed in a state where "8" is set as the variable 5, the variable S remains unchanged because the reproduction speed is already at the highest level.

Then, the CPU 10 executes a process of setting the variable n in accordance with the reproduction speed determined in step S3 (step S4). As described above, the automatic operation data 126 is stored as data acquired at a cycle of 5 ms. On the other hand, the game processing in the present embodiment is executed at a cycle of 16.7 ms (1/60 sec). Therefore, taking a case where a reproduction speed is 1× (a normal speed) as an example, a value "3" (obtained by rounding off a value calculated by 16.7/5 to the nearest integer) is set as the variable n, for example. Specifically, a setting is performed to repeat a process of reading the automatic operation data 126 corresponding to 1/60 sec three times. Alternatively, in the case where the reproduction speed is 2× (variable S="2"), a value "7" is set as the variable n in order to read data corresponding to 1/30 sec. In the case where the reproduction speed is 4× (variable S="4"), a value "13" is set as the variable n, for example, in order to read data corresponding to 1/15 sec.

Next, the CPU 10 sets "0" as a variable ctr (step S5) The variable ctr is a variable indicating the number of times a read process to be described below has been executed.

Then, the CPU 10 reads a piece of automatic operation data 126 from the Chapter-m data specified in step S1 (step S6). Note that the automatic operation data 126 is read by sequential access.

Subsequently, the CPU 10 operates the player character 101 in the virtual game space based on the piece of automatic operation data 26 having been read, and adopts the operation result to the virtual game space (step S7). That is, an operation content represented by the piece of the automatic operation data 126 is reflected in a state of the virtual game space. For example, when an operation content represents a scene in which the player character 101 attacks a predetermined enemy character and its attack hits the enemy character, a process of adding a predetermined damage value to the enemy character is executed together with a movement processing of the player character 101. In other words, except that the CPU 10 operates the player character 101 based on the automatic operation data 126, a process similar to the normal game processing (a game processing to be executed when "play with scenario" is selected on the screen shown in FIG. 10) is executed.

Next, the CPU 10 adds "1" to the variable ctr (step S8) Then, the CPU 10 determines whether or not the variable ctr is equal to the variable n (step S9). Specifically, the CPU 10 determines whether or not the number of times a process of steps S6 and S7 has been executed is equal to the number of times indicated by the variable n. As a result of the determination, when the variable ctr is not equal to the variable n (NO in step S9), the game processing returns to step S6 and repeats the process.

On the other hand, when the variable ctr is equal to the variable n (YES in step S9), the CPU 10 subsequently determines whether or not a time period corresponding to one frame has elapsed since a rendering was performed in an immediately preceding frame (step S10). As a result of the determination, when a time period corresponding to one frame has not yet elapsed (NO in step S10), a process of waiting until a time period corresponding to one frame has elapsed is executed. For example, when it takes only a time period corresponding to 0.2 frames to complete a repetition of the read process of the operation data and the like, a process of waiting until a remaining time period corresponding to 0.8 frames has elapsed is executed.

On the other hand, as a result of the determination in step S10, when a time period corresponding to one frame has elapsed (YES in step S10), the CPU 10 executes a rendering process (step S11). Specifically, a process of displaying, on the television 2, an image obtained by picking up the virtual game space by a virtual camera as a game image, is executed.

Next, the CPU 10 determines whether or not an instruction to join an ongoing game has been issued (step S12). Specifically, the CPU 10 determines whether the "join ongoing game" button 113 has been pressed on the screen shown in FIG. 16. As a result of the determination, when the "join ongoing game" button has been pressed (YES in step S12), the CPU 10 executes a process of shifting to the normal game processing (step S13). Specifically, an input source of information for controlling an operation of the player character 101 is switched from the automatic operation data 126 to the operation information transmitted from the controller 7. That is, an operation of the player character 101 is switched over to an operation controlled by the player. Furthermore, a screen display is also switched over to a game screen on which the virtual game space is displayed by using an entirety of a display area of the screen, as shown from the screen shown in FIG. 16 to the screen shown in FIG. 17. Then, the CPU 10 finishes the walkthrough movie reproduction process. Thus, the game processing in which the player character 101 is controlled thereafter based on an operation of the player (i.e., the game processing to be executed when "play with scenario" is selected on the screen shown in FIG. 10) is executed.

As a result of the determination in step S12, when an instruction to join an ongoing game has not been issued (NO in step S12), the CPU 10 determines whether or not a finish condition of the walkthrough movie reproduction process is satisfied (step S14). Such a finish condition includes "the walkthrough movie is reproduced all the way through to the end" or "an instruction to finish reproducing the walkthrough movie has been issued from the player", for example. As a result of the determination, when the finish condition is satisfied (YES in step S14), the walkthrough movie reproduction process is to be finished. On the other hand, when the finish condition is not satisfied (NO is step S14), the game processing returns to step S2 and repeats the process. As such, the walkthrough movie reproduction process is finished.

As described above, in the present embodiment, the CPU controls the player character 101 by using the automatic operation data 126, and a state of the virtual game space in which the player character 101 is controlled based on the automatic operation data 126 is displayed as a walkthrough movie. Thus, it becomes possible to prevent the player from getting stuck in the game. Even if the player is unfamiliar with the game, he or she can enjoy playing the game all the way through (until the game is cleared or to the end of the game). Furthermore, walkthrough information is shown as a "demonstration" performed by the CPU 10 which operates the player character. Therefore, it becomes possible to more clearly show the player how to move (operate) the player character.

Furthermore, by pressing the "join ongoing game" button 113 while the walkthrough movie is displayed, a control of the player character 101 is switched over to an operation controlled by the player. Therefore, while viewing a walkthrough movie, the player can start to operate the player character 101 by himself or herself from any desired point thereof. As a result, the player can enjoy playing the game by choosing to reproduce the walkthrough movie for scenes that require difficult operations such as an operation using the acceleration data or the angular rate data, and starting to operate the player character by himself or herself after such scenes are over. That is, the automatic operation data can be used for only portions which require operations difficult for the player. Therefore, even if a player is not very good at the game, it becomes possible to allow the player to enjoy the game all the way through to the end without giving up partway through, while providing him or her with the satisfaction of moderately operating the player character 101 by himself or herself.

Furthermore, the "join ongoing game" button 113 is provided, thereby allowing the player to join an ongoing game by interrupting the walkthrough movie. Thus, it also becomes possible to provide the player with a play style called a "'what if' experience". For example, it is assumed that the walkthrough movie has a scene in which there is a fork in a road leading left and right and the player character takes the right branch. In this case, the player can also enjoy the game by joining the ongoing game from the above scene and taking the left branch.

Furthermore, in the present embodiment, instead of reproducing a general moving image file (in an MPEG format), the aforementioned automatic operation data, more specifically, data generated by storing the operation information outputted from the controller 7 (i.e., data in the same form as that of the operation information) is used as the walkthrough movie.

Therefore, while the walkthrough movie is reproduced, the player can start at any time a gameplay controlled by an operation of the player himself or herself from any desired point thereof. For example, in the case where the walkthrough movie is reproduced by using a general moving image file, even if the player joins an ongoing game by pressing the "join ongoing game" button 113, a scene at which the player starts to play the game may not completely synchronize with a scene being currently reproduced. Depending on a timing, a currently-reproduced scene may be returned to a scene slightly preceding the scene at which the "join ongoing game" button is pressed. In the above embodiment, however, the walkthrough movie is reproduced by using the automatic operation data 126, thereby making it possible to start a gameplay controlled by an operation of the player from a scene continued from the scene at which the "join ongoing game" button 113 is pressed. That is, it becomes possible to more smoothly shift to a gameplay controlled by an operation of the player, while the walkthrough movie is reproduced.

Furthermore, in the present embodiment, a reproduction speed of the walkthrough movie is changed, thereby making it possible to allow the player to quickly view only portions he or she wishes to watch, skipping portions which have already been viewed once.

Furthermore, in the present embodiment, a scenario of a game is divided into a plurality of chapters. Therefore, the player can start to play the game from any desired point thereof. Thus, even if a player does not have much time to play the game and cannot spare a minute to challenge a scene which requires difficult operations over and over again, the present invention allows the player to select any chapter he or she likes and to choose whether to display the walkthrough movie or to join the ongoing game, whereby it becomes possible for the player to enjoy the game all the way through to the end without giving up partway through, while providing him or her with the satisfaction of moderately operating the player character 101 by himself or herself.

Although the above present embodiment illustrates an example where a reproduction speed of the walkthrough movie can be changed in eight stages from 1× to 8×, a slow reproduction may be additionally provided. For example, the reproduction speed may be changed in eight stages from 1× to ⅛×. In this case, when the reproduction speed is changed to ½×, for example, a value "1" (obtained by rounding off to the nearest integer) may be set as the variable n so as to read data corresponding to 1/120 sec. Alternatively, when the reproduction speed is ¼×, the automatic operation data 126 may be acquired once every two frames (i.e., each time a processing loop is executed twice). As described above, by performing a slow reproduction, it becomes possible to allow the player to deliberately observe a content of operations on how to conquer the game.

Furthermore, it is understood that a range within which the reproduction speed can be changed is not limited to 8× or ⅛×.

Furthermore, a content of the walkthrough movie (automatic operation data) is not limited to providing instructions on how to defeat the boss character mentioned above. The content of the walkthrough movie may be instructions on how to solve "riddles" with which the player is likely to get stuck in the game processing. Or, the content of the walkthrough movie may be procedures or methods on how to clear a so-called "mini game" (e.g., a shooting game or a puzzle game which is provided throughout the game because the present embodiment assumes that an action adventure game is played). That is, a game developer may pick up a scene where he or she believes that the player is likely to get stuck in the game processing, and a content showing how the game developer actually operates to clear the scene may be stored as the automatic operation data 126.

Although the above present embodiment illustrates an example where the automatic operation data 126 is stored at a cycle of 5 ms, the automatic operation data 126 may be stored at a cycle of a shorter time period (1 ms, for example). Thus, when the slow reproduction is performed, it becomes possible to allow the player to view a more minute movement (operation) of the player character 101. Alternatively, in line with a game processing unit, the automatic operation data 126 may be stored at a cycle of 16.7 ms (1/60 sec). In the case where the automatic operation data 126 is stored in line with a game processing unit, when the walkthrough movie is reproduced at a speed of 1×, apiece of automatic operation data 126 may be read each time the aforementioned processing loop is executed. When the walkthrough movie is reproduced at a speed of 2×, two pieces of automatic operation data 126 may be read each time the aforementioned processing loop is executed.

Although the above present embodiment illustrates an example where the automatic operation data 126 is created by storing an operation signal outputted from an operation actually performed by a game developer using the controller 7, the present invention is not limited thereto. The automatic operation data 126 may be directly created and edited. That is, data included in the automatic operation data 126 may be created by a manual input.

Furthermore, the automatic operation data may be downloaded from a predetermined server. For example, the game apparatus 3 may be connected to a predetermined server via the wireless communication module 18 so as to download the automatic operation data stored on the server, and the downloaded automatic operation data may be stored in the flash memory 17. In this case, the automatic operation data may include information for identifying a specific game and a specific scene included therein. When the game apparatus 3 executes a game processing of a corresponding game, the automatic operation data may be acquired from the flash memory 17 so as to execute a process of reproducing the walkthrough movie. Thus, the walkthrough movie can be distributed at a later time after the game appeared on the market. For example, when it is discovered after the game appeared on the market that a great number of players are stuck with a certain scene, which the developer believed was not difficult, the automatic operation data representing a method of conquering the scene is created and stored on the server. Then, a player is prompted to download the automatic operation data 126. With newly downloaded automatic operation data 126, even the players who have been stuck in the game can smoothly proceed with the game and thus it becomes possible to allow them to play the game all the way through until the game is cleared.

Although the above embodiment illustrates an example where the walkthrough movie is provided in the form of chapter menu, the present invention is not limited thereto. The player may reproduce the walkthrough movie at any desired time point, i.e., the player may choose to switch over an operation of the player character 101 to an operation controlled based on the automatic operation data 126 at any desired time point while playing the game. For example, the game developer previously plays the game all the way through from the beginning to the end (until the game is cleared, e.g., until an end screen is displayed), so as to store operation data obtained by the operation of the game developer. The operation data thus obtained is divided into a plurality of pieces of data in accordance with a state of a game progression so as to be stored as the automatic operation data 126 together with identification data representing each scene. In the case where the player selects "play with scenario" on the screen of FIG. 10 to start the game, in response to a predetermined operation (an operation of issuing an instruction to switch over to an automatic operation) performed by the player, the automatic operation data 126 corresponding to a scene in the game at a time point when the predetermined operation is performed may be read, so as to cause the CPU 10 to control an operation of the player character 101 based on the automatic operation data 126 having been read. In this case, when the player performs the predetermined operation, for example, the CPU 10 determines whether or not a condition required for clearing the scene is satisfied (e.g., whether the player character 101 acquires an item required for clearing the scene), and when the required condition is not satisfied, a necessary item, for example, is displayed as a tip to conquer the scene. On the other hand, when the required condition is satisfied, the automatic operation data may be read so as to switch over to a control performed based on the automatic operation data. Furthermore, in this case, a position (in the virtual game space) at which the control, performed based on the automatic operation data, is started may be designated. For example, when a switch button is pressed, an object indicating a position at which the control, performed by the automatic operation, is started (e.g., a marker or a message indicating that the player character 101 should move to the front of the door of a room where the boss character is located) is displayed on the screen, and the player operates the controller 7 so as to move the player character 101 to the position at which the control performed based on the automatic operation data is started. After the player character 101 is moved to the position at which the control performed based on the automatic operation data is started, the control of the player character 101 may be switched over to the control performed based on the automatic operation data 126. Thereafter, similarly to the embodiment mentioned above, an operation control of the player character 101 may be switched back to an operation of the controller 7 controlled by the player in response to an input of a predetermined operation performed by the player (i.e., an operation of pressing the "join ongoing game" button). Therefore, while playing the game, the player can proceed with the game by controlling the player character 101 based on the automatic operation data for scenes which require an extremely difficult operation such as a scene which he or she cannot clear even after several challenges. Thus, it becomes possible to prevent the player from getting stuck in the game and giving up clearing the game partway through, and thus the player can be kept motivated to play the game all the way through to the end.

Furthermore, the player may create the automatic operation data. When the player selects "play with scenario" shown in FIG. 10 to play the game, for example, a process may be executed so as to store the operation information transmitted from the controller 7 in a memory in response to an operation of "issuing an instruction to store data" performed by the player. Then, the operation information thus obtained may be stored in the flash memory 17 or a predetermined external storage medium (e.g., a memory card) as "player-created operation data". Thus, the "player-created operation data" can be distributed among a plurality of players. As a result, it becomes possible to provide the player with a playstyle in which he or she can show other players his or her own method of conquering the game. Furthermore, in the case where a game is executed by a stationary game apparatus, it also becomes possible to allow the player to acquire, for a scene which he or she cannot conquer, the automatic operation data 126 of the scene from a friend who has already conquered the scene, and to cause a stationary game apparatus of the player to reproduce the automatic operation data 126 having been acquired from the friend, thereby leaning a method of conquering the scene. Then, it also becomes possible to allow the player to switch over the control of the player character 101 to an operation performed by the player at any midpoint of the reproduction of the method of conquering the scene which has been acquired from the friend. As compared with the aforementioned case where the automatic operation data 126 is downloaded from a server, it is advantageous for the player not to have to wait until the automatic operation data 126 is uploaded to the server. Furthermore, by distributing walkthrough information in the form of "walkthrough movie" among the players, it becomes possible to facilitate communication among the players and thus another pleasure can be also provided with the players.

While the invention has been described in detail, the foregoing description is in all aspects illustrative and not restrictive. It is understood that numerous other modifications and variations can be devised without departing from the scope of the invention.

What is claimed is:

1. A game apparatus that executes game processing in which a player character is moved based on operation data outputted from an operation that is inputted to an input device controlled by a player, and is displayed on a display device, the game apparatus comprising:
   an operation data storage unit configured to store in advance a series of operation data, as automatic operation data, for continuously moving the player character for a period of time, instead of using the operation inputted in real time by the player;
   a selection unit configured to cause the player to select whether to play the game based on the operation inputted in real time by the player or to play the game based on the automatic operation data when the player starts a specific game scene selected by the player from a plurality of specific game scenes stored in advance in the operation data storage unit;
   an automatic controller configured to read the automatic operation data from the operation data storage unit when to play the game based on the automatic operation data is selected in the selection unit, so as to sequentially move the player character based on the read automatic operation data for the period of time from the start of the specific game scene, and to display the player character on the display device;
   a start reception unit configured to receive a play start operation indicating that the player has started to play the game during the period of time in which the player character is moved by the automatic controller;
   a game processor configured to stop the automatic controller from moving the player character based on the automatic operation data at a time when the play start operation is received, and to control, after the play start operation is received, movement of the player character so as to be continued from a state of the player character at the time when the play start operation is received, based on the operation data outputted from the operation that is inputted to the input device controlled by the player; and
   a speed change reception unit configured to receive, for the period of time during which the player character is moved by the automatic controller, an instruction to change a speed at which the movement of the player character is displayed, wherein the automatic controller displays the movement of the player character based on a speed set by the speed change reception unit; and wherein the automatic operation data is composed of a plurality of pieces of operation data divided by a unit time equal to or shorter than a time period in which a display is updated, and the automatic controller executes a movement process of sequentially reading the plurality of pieces of operation data divided by the unit time so as to move the player character based on each of the plurality of pieces of operation data, and displays, each time the display is updated, the player character at a time when the display is updated, on the display device, and changes the speed at which the movement of the player character is displayed by changing, in accordance with the speed set by the speed change reception unit, the number of times the movement process is executed within the time period in which the display is updated.

2. The game apparatus according to claim 1, wherein the automatic controller performs a fast-forward reproduction by increasing the number of times the movement processing is executed within the time period in which the display is updated.

3. The game apparatus according to claim 1, wherein the automatic controller performs a slow reproduction by decreasing the number of times the movement processing is executed within the time period in which the display is updated.

4. The game apparatus according to claim 1, wherein
the input device includes a button which can be pressed, and
the automatic operation data includes button data for indicating whether or not the button has been pressed.

5. The game apparatus according to claim 1, wherein
the input device includes an acceleration sensor, and
the automatic operation data includes acceleration data outputted from the acceleration sensor.

6. The game apparatus according to claim 1, wherein
the input device includes a gyro sensor, and
the automatic operation data includes angular rate data outputted from the gyro sensor.

7. The game apparatus according to claim 1, wherein
the input device includes an imaging unit for imaging at least one imaging target, and
the automatic operation data includes information regarding a position of the at least one imaging target included in a picked up image represented by picked up image data outputted from the input device including the imaging unit.

8. A game apparatus that executes game processing in which a player character is moved based on operation data outputted from an operation that is inputted to an input device controlled by a player, and is displayed on a display device, the game apparatus comprising:

an operation data storage unit configured to store in advance a series of operation data, as automatic operation data, for continuously moving the player character for a period of time, instead of using the operation inputted in real time by the player;

a selection unit configured to cause the player to select whether to play the game based on the operation inputted in real time by the player or to play the game based on the automatic operation data when the player starts a specific game scene;

an automatic controller configured to read the automatic operation data from the operation data storage unit when to play the game based on the automatic operation data is selected in the selection unit, so as to sequentially move the player character based on the read automatic operation data for the period of time from the start of the specific game scene, and to display the player character on the display device;

start reception unit configured to receive a play start operation indicating that the player has started to play the game during the period of time in which the player character is moved by the automatic controller and no player character in the game is moved based upon any operation inputted in real time by the player;

a game processor configured to stop the automatic controller from moving the player character based on the automatic operation data at a time when the play start operation is received, and to control, after the play start operation is received, movement of the player character so as to be continued from a state of the player character at the time when the play start operation is received, based on the operation data outputted from the operation that is inputted to the input device controlled by the player; and a speed change reception unit configured to receive, for the period of time during which the player character is moved by the automatic controller, an instruction to change a speed at which the movement of the player character is displayed, wherein the automatic controller displays the movement of the player character based on a speed set by the speed change reception unit; and wherein the automatic operation data is composed of a plurality of pieces of operation data divided by a unit time equal to or shorter than a time period in which a display is updated, and the automatic controller executes a movement process of sequentially reading the plurality of pieces of operation data divided by the unit time so as to move the player character based on each of the plurality of pieces of operation data, and displays, each time the display is updated, the player character at a time when the display is updated, on the display device, and changes the speed at which the movement of the player character is displayed by changing, in accordance with the speed set by the speed change reception unit, the number of times the movement process is executed within the time period in which the display is updated.

* * * * *